(12) United States Patent
Kawato et al.

(10) Patent No.: US 9,464,154 B2
(45) Date of Patent: Oct. 11, 2016

(54) PROCESS FOR PRODUCING POLYURETHANE RESIN

(71) Applicant: Mitsui Chemicals, Inc., Minato-ku, Tokyo (JP)

(72) Inventors: Nobuo Kawato, Kurume (JP); Tatsuya Ogawa, Ravenna (IT); Toshiya Hashimoto, Ichihara (JP); Mamoru Tanaka, Fukuoka (JP); Shigetoshi Kuma, Kurume (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/646,109

(22) PCT Filed: Nov. 1, 2013

(86) PCT No.: PCT/JP2013/079791
§ 371 (c)(1),
(2) Date: May 20, 2015

(87) PCT Pub. No.: WO2014/080750
PCT Pub. Date: May 30, 2014

(65) Prior Publication Data
US 2015/0315327 A1  Nov. 5, 2015

(30) Foreign Application Priority Data

Nov. 21, 2012 (JP) ................................ 2012-255568
Mar. 26, 2013 (JP) ................................ 2013-063478
Jun. 10, 2013 (JP) ................................ 2013-121627

(51) Int. Cl.
| | |
|---|---|
| *G02B 1/08* | (2006.01) |
| *C08G 18/76* | (2006.01) |
| *B29C 45/00* | (2006.01) |
| *G02B 1/04* | (2006.01) |
| *B29C 45/14* | (2006.01) |
| *C08G 18/32* | (2006.01) |
| *C08G 18/10* | (2006.01) |
| *C08K 5/3435* | (2006.01) |
| *C08K 5/521* | (2006.01) |
| *C08G 18/80* | (2006.01) |
| *C08G 18/38* | (2006.01) |
| *B29L 11/00* | (2006.01) |

(52) U.S. Cl.
CPC ........... *C08G 18/10* (2013.01); *B29C 45/0001* (2013.01); *B29C 45/14008* (2013.01); *C08G 18/3206* (2013.01); *C08G 18/3885* (2013.01); *C08G 18/7621* (2013.01); *C08G 18/8029* (2013.01); *C08K 5/3435* (2013.01); *C08K 5/521* (2013.01); *G02B 1/04* (2013.01); *G02B 1/041* (2013.01); *G02B 1/08* (2013.01); *B29L 2011/0016* (2013.01); *C08G 2120/00* (2013.01)

(58) Field of Classification Search
CPC .............. C08G 18/10; C08G 18/3206; C08G 18/3885; C08G 18/7621; C08G 18/8029; C08G 2120/00; B29C 45/001; B29C 45/14008; B29L 2011/0016; C08K 5/3435; C08K 5/521; G02B 1/04; G02B 1/041; G02B 1/08
See application file for complete search history.

(56) References Cited

U.S. PATENT DOCUMENTS

| | | | | |
|---|---|---|---|---|
| 4,789,710 A * | 12/1988 | Furukawa | .............. | C08G 18/10 428/395 |
| 4,946,923 A * | 8/1990 | Nagata | .................... | B29C 33/60 264/1.1 |
| 5,482,777 A * | 1/1996 | Yamakawa | ........ | C08G 18/0804 252/62.54 |
| 5,721,018 A * | 2/1998 | Goldner | ................ | B05D 5/068 427/140 |
| 6,486,238 B1 * | 11/2002 | Kitamura | ............. | C07D 211/46 524/100 |
| 2004/0092699 A1 * | 5/2004 | Ueno | ................. | C08G 18/0895 528/66 |
| 2004/0204555 A1 * | 10/2004 | Noda | .................... | C08F 220/18 526/242 |
| 2005/0131203 A1 * | 6/2005 | Tanaka | ............... | C08G 18/3876 528/373 |
| 2009/0281268 A1 | 11/2009 | Rukavina et al. | | |
| 2010/0016517 A1 * | 1/2010 | Iwazumi | ............ | C08G 18/1875 525/452 |
| 2010/0056746 A1 | 3/2010 | Kajita et al. | | |

(Continued)

FOREIGN PATENT DOCUMENTS

| | | |
|---|---|---|
| EP | 0676429 A2 | 10/1995 |
| JP | 2001-106971 | 4/2001 |

(Continued)

OTHER PUBLICATIONS

International Search Report (PCT/ISA/210) mailed on Feb. 18, 2014, by the Japanese Patent Office as the International Searching Authority for International Application No. PCT/JP2013/079791.

(Continued)

*Primary Examiner* — Frank Font
(74) *Attorney, Agent, or Firm* — Buchanan, Ingersoll & Rooney PC

(57) ABSTRACT

A process for producing a polyurethane resin of the present invention includes a step (i) of obtaining a prepolymer by adding an alcohol (B) to isocyanate (A) such that a ratio of hydroxyl groups to isocyanato groups of the isocyanate (A) falls into a range of 10 mol % to 20 mol % and reacting the isocyanate (A) with the alcohol (B) in the presence of an acidic phosphoric acid ester (C) and a hindered amine-based compound (D), a step (ii) of obtaining a polymerizable composition in a manner in which the alcohol (B) is further added to and mixed with the prepolymer at a temperature of equal to or less than 30° C., and a step (iii) of polymerizing the prepolymer and the alcohol (B) contained in the polymerizable composition. The isocyanate (A) contains an aromatic isocyanate and the alcohol (B) has two or more hydroxyl groups and is further defined.

20 Claims, 1 Drawing Sheet

(56) References Cited

U.S. PATENT DOCUMENTS

| | | | |
|---|---|---|---|
| 2011/0009510 A1* | 1/2011 | Gotoh | C08G 18/0852 521/88 |
| 2011/0251301 A1 | 10/2011 | Bos et al. | |
| 2015/0293265 A1* | 10/2015 | Kawato | C08K 5/521 528/72 |

FOREIGN PATENT DOCUMENTS

| | | |
|---|---|---|
| JP | 2002-187931 A | 7/2002 |
| JP | 2008-144154 A | 6/2008 |
| JP | 2009-520057 A | 5/2009 |
| WO | WO 2007/078549 A2 | 7/2007 |

OTHER PUBLICATIONS

Extended Search Report issued by the European Patent Office in corresponding European Patent Application No. 13857478.5 on Jun. 1, 2016 (4 pages).

* cited by examiner

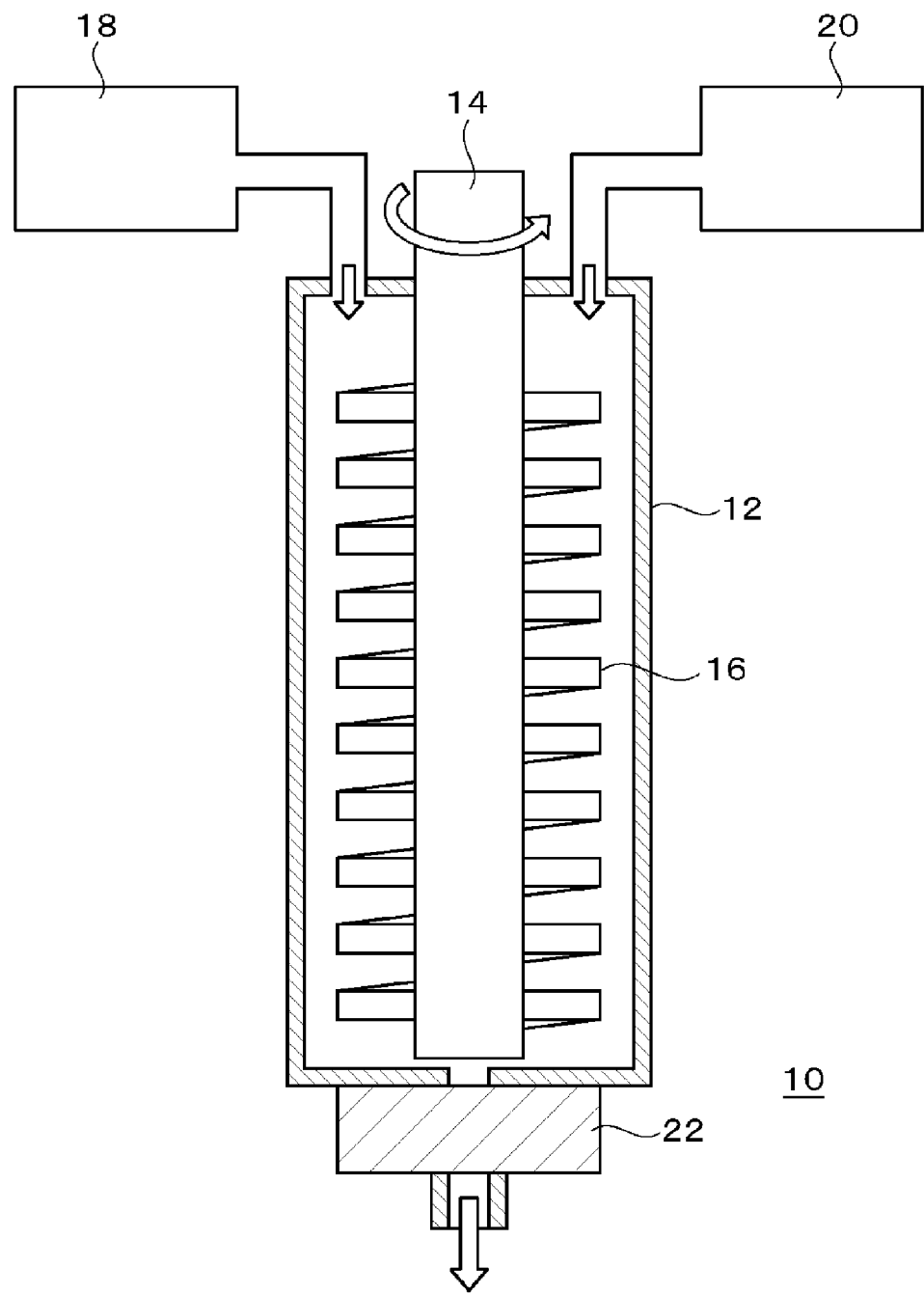

PROCESS FOR PRODUCING POLYURETHANE RESIN

TECHNICAL FIELD

The present invention relates to a process for producing a polyurethane resin and an optical material obtained by the process.

BACKGROUND ART

A plastic lens is lighter than an inorganic lens, is not easily broken, and is dyeable. Therefore, the plastic lens has become rapidly widespread as an optical element such as a spectacle lens or a camera lens. Up to now, various resins for spectacle lenses have been developed and used. Typical examples of the resins include an allyl resin obtained from diethylene glycol bisallyl carbonate or diallyl isophthalate, a (meth)acryl resin obtained from (meth)acrylate, and a thio-polyurethane resin obtained from isocyanate and thiol.

Recently, a polyurethane resin comprised of isocyanate and an alcohol has been developed (Patent Documents 1 to 3).

Generally, the compatibility between isocyanate and an alcohol is poor. Accordingly, the process for producing a polyurethane resin described in Patent Documents 1 to 3 employs a method of reacting isocyanate with a portion of the alcohol first (hereinafter, this step will be referred to as "prepolymerization") and then reacting the prepolymer with remaining alcohol. Generally, the prepolymerization is performed by heating. Moreover, because the prepolymer as a reactant has high viscosity, the reaction between the prepolymer and remaining alcohol is also performed by heating so as to improve workability and compatibility.

For example, in paragraph [0233] of Examples of Patent Document 1 (PCT Japanese Translation Patent Publication No. 2009-520057), the conditions of the prepolymerization are described as below.

"4,4'-Methylene bis(cyclohexylisocyanate) (1.0 molar equivalent) is heated to 70° C., 1,1,1-tris(hydroxymethyl) propane (0.2 molar equivalents) is then added thereto, and the reaction temperature is maintained at a temperature of less than 120° C."

Furthermore, viscosity at 73° C. of prepolymers 1, 2, and 3 obtained in Example is high, such as 90 mPa·s, 2,103 mPa·s, and 7,000 mPa·s respectively (Table 1). Therefore, according to the documents, these prepolymers are heated to 70° C., 70° C., and 80° C. respectively so as to improve workability at the time of handling the prepolymers.

Paragraph [0054] of Detailed Description of Patent Document 2 (Japanese Unexamined Patent Publication No. 2008-144154) describes that the prepolymerization is performed under the condition in which "it is heated in a reaction container at a temperature of, for example, room temperature to 150° C. and preferably at a temperature of 50° C. to 120° C." Moreover, paragraph [0078] of Examples of the document describes that the prepolymerization is performed under the condition in which "reactants are reacted at 90° C. for 4 hours."

In paragraph [1086] of Examples of Patent Document 3 (US 2009/0281268 A1), the condition of the prepolymerization is described as below.

"An isocyanate functional urethane prepolymer was prepared by reacting 0.3 equivalents of 1,5-pentanediol, 1.0 equivalent of DESMODUR W 4,4'-methylene-bis-(cyclohexyl isocyanate) and 5 ppm dibutyltin diacetate as reactants. The DESMODUR W and 1,5-pentanediol were each preheated to a temperature of about 80° C. under a nitrogen atmosphere for at least about four hours prior to mixing."

In addition, Table 27 of the document describes that a tank temperature of the prepolymer is maintained at a high temperature of 110° C. to 127° C.

In Patent Document 4 (Japanese Unexamined Patent Publication No. 2002-187931), the viscosity of a urethane prepolymer having various isocyanato groups is described. According to the document, the viscosity at 30° C. of the prepolymer is high such as 2,200 mPa·s to 8,600 mPa·s.

RELATED DOCUMENT

Patent Document

[Patent Document 1] PCT Japanese Translation Patent Publication No. 2009-520057

[Patent Document 2] Japanese Unexamined Patent Publication No. 2008-144154

[Patent Document 3] US 2009/0281268 A1

[Patent Document 4] Japanese Unexamined Patent Publication No. 2002-187931

DISCLOSURE OF THE INVENTION

In the process for producing a polyurethane resin described in the aforementioned related documents, aliphatic or alicyclic isocyanate is used as isocyanate. From the viewpoint of optical properties and the like, development of a polyurethane resin using an aromatic isocyanate is required.

Therefore, the present inventors performed examination regarding a process for producing a polyurethane resin comprised of aromatic isocyanate and an alcohol. As a result, it was found that particularly in scale-up manufacturing, the quantity of heat produced by a reaction at the time of blending became great, the reaction was further accelerated due to the heat quantity, and consequentially, the viscosity of a polymerizable composition rapidly increased. When such a polymerizable composition was used, it was not easily injected into a mold. Furthermore, even when casting could be performed, an injection flow mark which is formed as a result of casting performed by using a highly viscous material or striae which is formed as a result of polymerization proceeding rapidly was observed in some cases.

Therefore, in order to reduce the quantity of heat produced by a rapid reaction in a process for producing a polyurethane resin comprised of aromatic isocyanate and an alcohol, by performing prepolymerization, the present inventors tried a process for producing a polyurethane resin or a molded product comprised of the resin by preventing heat produced by the rapid reaction. However, because the reactivity of the aromatic isocyanate is higher than that of the aliphatic or alicyclic isocyanate in the related art, the viscosity of the polymerizable composition further increased, and accordingly, the polymerizable composition could not be injected into a mold in some cases.

In order to solve the above problems, the present inventors performed intensive research, such that even in a case in which aromatic isocyanate is used, by the use of a prepolymer or a polymerizable composition which has low viscosity and is excellent in handleability at room temperature, a polyurethane resin can be obtained with an excellent yield, and a polyurethane-molded product can be obtained in which the occurrence of an injection flow mark or striae is inhibited and which enables mass production.

The present inventors found that in a method, which includes a step of prepolymerizing a specific aromatic isocyanate and a specific alcohol, a step of then producing a polymerizable composition of the obtained prepolymer and an alcohol, and a step of producing a polyurethane resin from the polymerizable composition, the above problems can be solved when the reaction condition of the prepolymerizing step and the preparation condition of the polymerizable composition preparing step are optimized. Based on the finding, the present inventors completed the present invention.

That is, the present invention is as follows.

[1] A process for producing a polyurethane resin, including a step (i) of obtaining a prepolymer by adding an alcohol (B) to isocyanate (A) such that a ratio of hydroxyl groups to isocyanato groups of the isocyanate (A) falls into a range of 10 mol % to 20 mol % and reacting the isocyanate (A) with the alcohol (B) in the presence of an acidic phosphoric acid ester (C) and a hindered amine-based compound (D), a step (ii) of obtaining a polymerizable composition in a manner in which the alcohol (B) is further added to and mixed with the prepolymer at a temperature of equal to or less than 30° C., and a step (iii) of polymerizing the prepolymer and the alcohol (B) contained in the polymerizable composition, in which the isocyanate (A) is one or more kinds of isocyanate having two or more isocyanato groups, which contains aromatic isocyanate, the alcohol (B) includes one or more kinds of alcohol having two or more hydroxyl groups, and in the alcohol (B), a ratio of secondary hydroxyl groups to a total molar number of primary and secondary hydroxyl groups is equal to or greater than 50 mol %.

[2] The process described in [1], in which a reaction temperature of the step (i) is equal to or less than 30° C.

[3] The process described in [1] or [2], in which in the step (iii), a heating start temperature at the time of polymerizing the prepolymer and the alcohol (B) is equal to or less than 30° C.

[4] The process described in any one of [1] to [3], in which the viscosity of the prepolymer and the polymerizable composition is equal to or less than 1,000 mPa·s at 20° C.

[5] The process described in any one of [1] to [4], in which the step (iii) is performed by using a mixing apparatus including a cylindrical container, a shaft that has been inserted into the container from the upper portion of the container along the central axis direction of the container, a stirring blade that is wound in the form of a screw around the outer circumferential surface of the shaft, a first supply portion that is disposed in the upper portion of the container and supplies the prepolymer into the container, a second supply portion that is disposed in the upper portion of the container and supplies the alcohol (B) into the container, and an ejection portion disposed at the bottom of the container, and includes a step of supplying the prepolymer and the alcohol (B) into the container from the first supply portion and the second supply portion respectively, and a step of preparing the polymerizable composition by rotating the shaft such that the prepolymer and the alcohol (B) are moved down while being mixed together at a temperature of equal or less than 30° C. by the stirring blade, which is wound in the form of a screw around the outer circumferential surface of the shaft, and ejecting the obtained polymerizable composition from the ejection portion.

[6] The process described in [5], in which a rotation frequency of the shaft is within a range of 1,000 rpm to 4,000 rpm, and a rate at which the polymerizable composition is ejected from the ejection portion is within a range of 0.5 g/s to 4.0 g/s.

[7] The process described in [5] or [6], in which the viscosity of the polymerizable composition obtained in the step (ii) is equal to or less than 500 mPa·s at 20° C.

[8] The process described in any one of [1] to [7], in which the aromatic isocyanate contained in the isocyanate (A) is 2,4-tolylene diisocyanate or a mixture of 2,4-tolylene diisocyanate and 2,6-tolylene diisocyanate.

[9] The process described in any one of [1] to [8], in which the alcohol (B) contains one or more kinds of compound selected from among glycerol, diglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol.

[10] The process described in any one of [1] to [9], in which the alcohol (B) contains one or more kinds of compound selected from among a propylene oxide adduct of glycerol, a propylene oxide adduct of trimethylolpropane, and a propylene oxide adduct of pentaerythritol.

[11] The process described in any one of [1] to [10], in which the acidic phosphoric acid ester (C) is contained in the polymerizable composition, in an amount of 0.1 parts by weight to 3.0 parts by weight with respect to a total of 100 parts by weight of the isocyanate (A) and the alcohol (B).

[12] The process described in any one of [1] to [11], in which the acidic phosphoric acid ester (C) is an acidic phosphoric acid ester represented by Formula (1),

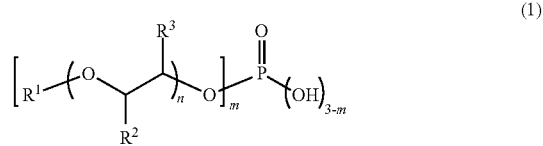

wherein, in the formula, m represents an integer of 1 or 2; n represents an integer of 0 to 18, R¹ represents an alkyl group having 1 to 20 carbon atoms; and each of R² and R³ independently represents a hydrogen atom, a methyl group, or an ethyl group.

[13] The process described in any one of [1] to [12], the hindered amine-based compound (D) is contained in the polymerizable composition, in an amount of 0.1 parts by weight to 2.0 parts by weight with respect to a total of 100 parts by weight of the isocyanate (A) and the alcohol (B).

[14] A polyurethane resin obtained by the process described in any one of [1] to [13].

[15] A manufacturing method of a polyurethane-molded product, in which in the process for producing a polyurethane resin described in any one of [1] to [13], the step (iii) includes a step of injecting the polymerizable composition into a mold and a step of polymerizing the prepolymer and the alcohol (B) contained in the polymerizable composition in the mold.

[16] A polyurethane-molded product obtained by the manufacturing method described in [15].

[17] An optical material comprised of the polyurethane-molded product described in [16].

[18] A plastic lens comprised of the optical material described in [17].

[19] A manufacturing method of a plastic polarizing lens, in which in the process for producing a polyurethane resin described in any one of [1] to [13], a step of fixing a polarizing film into a casting mold for lens casting in a state in which at least one surface of the polarizing film is separated from the mold is performed before the step (iii), and the step (iii) includes a step of injecting the polymerizable composition obtained in the step (ii) into space(s) between the polarizing film and the mold and a step of polymerizing and curing the polymerizable composition and laminating a layer comprised of the polyurethane resin over at least one surface of the polarizing film.

[20] A plastic polarizing lens obtained by the manufacturing method described in [19].

According to the process for producing a polyurethane resin of the present invention, even when aromatic isocyanate is used, it is possible to use a prepolymer or a polymerizable composition excellent in handleability at room temperature (equal to or less than 30° C.) and to obtain a polyurethane resin with an excellent yield, and production stability of a polyurethane resin becomes excellent.

Moreover, when the process for producing a polyurethane resin of the present invention is applied to a manufacturing method of a polyurethane-molded product, it is possible to stably obtain a polyurethane-molded product in which the occurrence of an injection flow mark or striae is inhibited. Such a polyurethane-molded product can be suitably used as various optical materials that require a high degree of transparency. The process for producing a polyurethane resin is appropriate for industrial production of a polyurethane-molded product.

BRIEF DESCRIPTION OF THE DRAWINGS

FIG. 1 is a schematic cross-sectional view of a mixing apparatus in the present embodiment.

DESCRIPTION OF EMBODIMENTS

The process for producing a polyurethane resin of the present invention includes the following steps (i) to (iii).

Step (i): an alcohol (B) is added to isocyanate (A) such that a ratio of hydroxyl groups to isocyanato groups of the isocyanate (A) falls into a range of 10 mol % to 20 mol %, and the alcohol (B) and the isocyanate (A) are reacted in the presence of an acidic phosphoric acid ester (C) and a hindered amine-based compound (D), thereby obtaining a prepolymer.

Step (ii): at a temperature of equal to or less than 30° C., the following alcohol (B) is further added to and mixed with the prepolymer, thereby obtaining a polymerizable composition.

Step (iii): the prepolymer and the alcohol (B) contained in the polymerizable composition are polymerized.

The isocyanate (A) is one or more kinds of isocyanate having two or more isocyanato groups, which contains aromatic isocyanate. The alcohol (B) includes one or more kinds of alcohol having two or more hydroxyl groups. In the alcohol (B), a ratio of secondary hydroxyl groups to a total molar number of primary and secondary hydroxyl groups is equal to or greater than 50 mol %.

Hereinafter, embodiments of the present invention will be described by appropriately using drawings. In all of the drawings, the same constituents are marked with the same reference numerals, and the description thereof will not be repeated.

First, each component will be described.

[Isocyanate (A)]

The isocyanate (A) is one or more kinds of isocyanate having two or more isocyanato groups and contains aromatic isocyanate. The aromatic isocyanate is an isocyanate in which two or more isocyanato groups are directly bound to an aromatic ring. Specific examples of the aromatic isocyanate include tolylene diisocyanate, 4,4'-diphenylmethane diisocyanate, 2,4'-diphenylmethane diisocyanate, phenylene diisocyanate, and the like. One kind of the aromatic isocyanate can be used singly, or two or more kinds thereof can be used in combination. The isocyanate (A) contains the aromatic isocyanate in an amount of 80% by weight to 100% by weight.

In the present embodiment, the aromatic isocyanate preferably contains tolylene diisocyanate and more preferably is tolylene diisocyanate. The tolylene diisocyanate is one or more kinds of isocyanate selected from among 2,4-tolylene diisocyanate and 2,6-tolylene diisocyanate. Examples of the tolylene diisocyanate include 2,4-tolylene diisocyanate, 2,6-tolylene diisocyanate, and a mixture of 2,4-tolylene diisocyanate and 2,6-tolylene diisocyanate. Furthermore, the tolylene diisocyanate may include a dimer, a trimer, and a prepolymer.

In the present embodiment, the tolylene diisocyanate preferably contains 2,4-tolylene diisocyanate. Specifically, 2,4-tolylene diisocyanate can be used singly, or alternatively, a mixture of 2,4-tolylene diisocyanate and 2,6-tolylene diisocyanate can be used. When such a mixture is used, a mixing ratio between 2,4-tolylene diisocyanate and 2,6-tolylene diisocyanate is preferably 75:25 to 85:15.

In the present embodiment, the isocyanate (A) can contain isocyanate having two or more isocyanato groups, in addition to the aromatic isocyanate. Examples of such isocyanate include aliphatic isocyanate, alicyclic isocyanate, heterocyclic isocyanate, and the like.

Examples of the aliphatic isocyanate include hexamethylene diisocyanate, 2,2,4-trimethylhexamethylene diisocyanate, 2,4,4-trimethylhexamethylene diisocyanate, lysine diisocyanate methyl ester, lysine triisocyanate, m-xylylene diisocyanate, α,α,α',α'-tetramethylxylylene diisocyanate, bis(isocyanatomethyl)naphthaline, mesitylene triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, bis(isocyanatomethylthio)ethane, and the like.

Examples of the alicyclic isocyanate include isophorone diisocyanate, bis(isocyanatomethyl)cyclohexane, dicyclohexylmethane diisocyanate, cyclohexane diisocyanate, methyl cyclohexane diisocyanate, dicyclohexyl dimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane, and the like.

Examples of the heterocyclic isocyanate include 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and the like.

[Alcohol (B)]

The alcohol (B) is constituted with one or more kinds of alcohol having two or more hydroxyl groups. In the alcohol (B), a ratio of secondary hydroxyl groups to a total molar number of primary and secondary hydroxyl groups is equal to or greater than 50 mol %. The alcohol (B) may be constituted with one kind of alcohol in which the ratio of the secondary hydroxyl groups is equal to or greater than 50 mol %, or may be constituted with two or more kinds of compounds in which the ratio of the secondary hydroxyl groups is equal to or greater than 50 mol %. Considering the workability, the ratio of the secondary hydroxyl groups to the total molar number of the primary and secondary hydroxyl groups is preferably equal to or greater than 60 mol % and more preferably equal to or greater than 70 mol %.

The ratio of the secondary hydroxyl groups can be calculated by proton nuclear magnetic resonance spectroscopy, $^1$H-NMR. In a methylene group (—CH$_2$—(OH)) and a methine group (—CH(R)—(OH)) in which hydroxyl groups are adjacent to each other, the chemical shifts of protons are overlapped with each other in a broad area. Accordingly, the chemical shifts cannot be individually differentiated. However, when the hydroxyl groups are esterified by carboxylic acid having an electron-attracting group such as trifluoroacetic acid, the chemical shift occurs in a low magnetic field, and as a result, protons of the methylene group and the methine group can be differentiated. For example, when the hydroxyl groups are esterified by trifluoroacetic anhydride, generally, the protons of the methine group undergo a chemical shift of 5.3 ppm to 5.6 ppm, and the protons of the methylene group undergo a chemical shift of 4.2 ppm to 4.5 ppm. Consequentially, from the ratio of an integral value of the peak thereof, the ratio of the secondary hydroxyl groups can be calculated. Provided that the integral value of the chemical shift of 5.3 ppm to 5.6 ppm is A, and the integral value of the chemical shift of 4.2 ppm to 4.5 ppm is B, a ratio X of the secondary hydroxyl groups can be calculated by the following equation.

$$X=A/(A+B/2)\times 100$$

The alcohol (B) is one or more kinds of aliphatic or alicyclic alcohol. Specific examples thereof include linear or branched aliphatic alcohols, alicyclic alcohols, alcohols obtained by adding ethylene oxide, propylene oxide, or ε-caprolactone to the aforementioned alcohols, and the like.

Examples of the linear or branched aliphatic alcohols include ethylene glycol, diethylene glycol, triethylene glycol, propylene glycol, dipropylene glycol, tripropylene glycol, 1,3-propanediol, 2,2-dimethyl-1,3-propanediol, 2,2-diethyl-1,3-propanediol, 1,2-butanediol, 1,3-butanediol, 1,4-butanediol, 3-methyl-1,3-butanediol, 1,2-pentanediol, 1,3-pentanediol, 1,5-pentanediol, 2,4-pentanediol, 2-methyl-2,4-pentanediol, 3-methyl-1,5-pentanediol, 1,6-hexanediol, 2,5-hexanediol, glycerol, diglycerol, polyglycerol, trimethylolpropane, pentaerythritol, di(trimethylolpropane), and the like.

Examples of the alicyclic alcohols include 1,2-cyclopentanediol, 1,3-cyclopentanediol, 3-methyl-1,2-cyclopentanediol, 1,2-cyclohexanediol, 1,3-cyclohexanediol, 1,4-cyclohexanediol, 4,4'-bicyclohexanol, 1,4-cyclohexanedimethanol, and the like.

The alcohol (B) may be a compound obtained by adding ethylene oxide, propylene oxide, or ε-caprolactone to the above alcohols. Examples of the compound include an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, a propylene oxide adduct of pentaerythritol, caprolactone-modified glycerol, caprolactone-modified trimethylolpropane, caprolactone-modified pentaerythritol, and the like. The molar number of ethylene oxide, propylene oxide, or ε-caprolactone added to the alcohols is preferably 0.7 moles to 3.0 moles and more preferably 0.7 moles to 2.0 moles with respect to 1 mole of hydroxyl groups in the alcohols.

For the alcohol (B), one or more kinds selected from among ethylene glycol, diethylene glycol, triethylene glycol, propylene glycol, dipropylene glycol, tripropylene glycol, glycerol, diglycerol, polyglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol are preferably used; and one or more kinds selected from among glycerol, diglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol are more preferably used.

In the present embodiment, it is particularly preferable for the alcohol (B) to contain at least one kind selected from among a propylene oxide adduct of glycerol, a propylene oxide adduct of trimethylolpropane, and a propylene oxide adduct of pentaerythritol.

As the propylene oxide adduct of glycerol, an adduct is preferable in which is the amount of propylene oxide added to glycerol is 0.7 moles to 1.3 moles with respect to 1 mole of hydroxyl groups in the glycerol. A hydroxyl value of the adduct is preferably from 520 mg KOH/g to 810 mg KOH/g, and more preferably from 580 mg KOH/g to 680 mg KOH/g. As the propylene oxide adduct of trimethylolpropane, an adduct is preferable in which the amount of propylene oxide added to trimethylolpropane is 0.8 moles to 1.3 moles with respect to 1 mole of hydroxyl groups in the trimethylolpropane. A hydroxyl value of the adduction is preferably from 460 mg KOH/g to 600 mg KOH/g, and more preferably from 520 mg KOH/g to 580 mg KOH/g. The hydroxyl value can be measured by a known method.

In the present embodiment, it is preferable to use a combination of tolylene diisocyanate as the isocyanate (A) and a compound as the alcohol (B) that contains at least one kind selected from among a propylene oxide adduct of glycerol, a propylene oxide adduct of trimethylolpropane, and a propylene oxide adduct of pentaerythritol.

[Acidic Phosphoric Acid Ester (C)]

The acidic phosphoric acid ester (C) is represented by Formula (1) and is used as a release agent in the related art. However, in the present invention, the acidic phosphoric acid ester (C) is also used as urethanation catalyst.

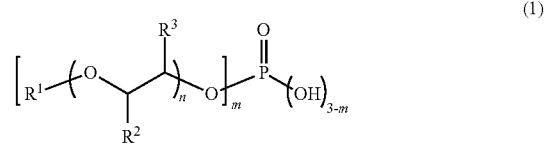

(1)

In Formula (1), m represents an integer of 1 or 2; n represents an integer of 0 to 18, R$^1$ represents an alkyl group having 1 to 20 carbon atoms; and each of R$^2$ and R$^3$ independently represents a hydrogen atom, a methyl group, or an ethyl group. The unit in the square bracket preferably has 4 to 20 carbon atoms.

Examples of R$^1$ in Formula (1) include organic residues derived from linear aliphatic compounds such as methane, ethane, propane, butane, pentane, hexane, heptane, octane, nonane, decane, undecane, dodecane, tetradecane, and hexadecane; organic residues derived from branched aliphatic compounds such as 2-methylpropane, 2-methylbutane, 2-methylpentane, 3-methylpentane, 3-ethylpentane, 2-methylhexane, 3-methylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, and 4-propyloctane; organic residues derived from alicyclic compounds such as cyclopentane, cyclohexane, 1,2-dimethylcyclohexane, 1,3-dimethylcyclohexane, and 1,4-dimethylcyclohexane; and the like. However, $R^1$ is not limited to these example compounds and may be in the form of a mixture thereof.

Furthermore, in Formula (1), n is preferably 0, and the compound can be represented by Formula (2).

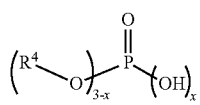

(2)

In Formula (2), x represents an integer of 1 or 2, and $R^4$ represents an alkyl group having 8 to 16 carbon atoms.

Examples of $R^4$ in Formula (2) include organic residues derived from linear aliphatic compounds such as octane, nonane, decane, undecane, dodecane, tetradecane, and hexadecane; organic residues derived from branched aliphatic compounds such as 2-ethylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, and 4-propyloctane; organic residues derived from alicyclic compounds such as 1,2-dimethylcyclohexane, 1,3-dimethylcyclohexane, and 1,4-dimethylcyclohexane; and the like. However, $R^4$ is not limited to these example compounds and may be in the form of a mixture thereof.

As the acidic phosphoric acid ester (C), Zelec UN manufactured by Stepan Company, internal mold release agents for MR manufactured by Mitsui Chemicals, Inc., a JP series manufactured by JOHOKU CHEMICAL CO., LTD., a Phosphanol series manufactured by TOHO Chemical Industry Co., Ltd., an AP or DP series manufactured by DAIHACHI CHEMICAL INDUSTRY CO., LTD., and the like can be used. Among these, Zelec UN manufactured by Stepan Company and internal mold release agents for MR manufactured by Mitsui Chemicals, Inc. are more preferable.

The amount of the acidic phosphoric acid ester (C) added is preferably 0.1 parts by weight to 3.0 part by weight, and more preferably 0.2 parts by weight to 2.0 by weight with respect to a total of 100 parts by weight of the isocyanate (A) and the alcohol (B). When the amount is within the above range, workability at the time of blending or casting becomes excellent, and it is possible to obtain a molded product in which the occurrence of striae is inhibited.

Generally, as a catalyst for urethane resins, tertiary amine, an aminocarboxylic acid salt, a metal catalyst, or the like is used. When these catalysts are used in the polymerizable composition for an optical material of the present invention, the reactivity increases. Therefore, the viscosity of the polymerizable composition for an optical material of the present invention increases too much at the time of injecting the composition into a mold, workability deteriorates, and as a result, striae occur in the obtained molded product in some cases. In the present invention, when specific cyclic amines are used concurrently with a specific acidic phosphoric acid ester, it is preferable since workability at the time of blending and casting becomes better, the occurrence of striae is effectively inhibited, and the molded product comprised of isocyanate and an alcohol of the present invention can be manufactured with high quality and excellent workability. As a result, the molded product is applicable to spectacles.

Examples of the specific cyclic amines include imidazoles such as imidazole, 1,2-dimethylimidazole, benzylmethyl imidazole, 2-ethyl-4-imidazole; and hindered amines including 1,2,2,6,6-piperidine compounds such as 1,2,2,6,6-pentamethyl-4-piperidinol, 1,2,2,6,6-pentamethyl-4-hydroxyethyl-4-piperidinol, methyl-1,2,2,6,6-pentamethyl-4-piperidyl sebacate, a mixture of methyl-1,2,2,6,6-pentamethyl-4-piperidyl sebacate and bis(1,2,2,6,6-pentamethyl-4-piperidyl)sebacate, bis(1,2,2,6,6-pentamethyl-4-piperidyl)sebacate, bis(2,2,6,6-tetramethyl-1-(octyloxy)-4-piperidyl)sebacate, bis(1,2,2,6,6-pentamethyl-4-piperidyl)[[3,5-bis(1,1-dimethylethyl)-4-hydroxyphenyl]methyl]butyl malonate, and tetrakis(1,2,2,6,6-pentamethyl-4-piperidyl)butane-1,2,3,4-tetracarboxylate.

As the cyclic amines, imidazoles, hindered amines, and the like are preferable, and hindered amines are more preferable.

[Hindered Amine-Based Compound (D)]

Hindered amine is used as a light stabilizer, and examples thereof include the aforementioned compounds. Examples of commercially available products thereof include Lowilite 76 and Lowilite 92 manufactured by Chemtura Corporation, Tinuvin 144, Tinuvin 292, and Tinuvin 765 manufactured by BASF Corporation, Adeka Stab LA-52 and LA-72 manufactured by ADEKA CORPORATION, JF-95 manufactured by JOHOKU CHEMICAL CO., LTD., and the like.

The amount of the hindered amine-based compound (D) added is preferably 0.1 parts by weight to 2.0 parts by weight, and more preferably 0.2 parts by weight to 1.5 parts by weight, with respect to a total of 100 parts by weight of the isocyanate (A) and the alcohol (B). When the amount is within the above range, it is possible to obtain a molded product which has excellent color and in which the occurrence of striae is inhibited.

[Other Additives]

In the present embodiment, according to the purpose, the polymerizable composition can contain additives such as a light stabilizer, an ultraviolet absorber, an antioxidant, a coloring inhibitor, a dye, and a resin modifier. The manufacturing procedure varies with the type and amount of the isocyanate (A), the alcohol (B), and additives used. Accordingly, the method of adding the additives is not particularly limited and is appropriately selected in consideration of the solubility of the additives, operability, safety, convenience, and the like. These additives can be added in the step (i) and the step (ii) which will be described later, or can be added in either the step (i) or the step (ii).

As the ultraviolet absorber, benzotriazole-based compounds, triazine-based compounds, benzophenone-based compounds, and benzoate-based compounds are preferable, and benzotriazole-based compounds are more preferable. The amount of the ultraviolet absorber added is preferably 0.05 parts by weight to 2.0 parts by weight, and more preferably 0.05 parts by weight to 1.5 parts by weight, with respect to a total of 100 parts by weight of the isocyanate (A) and the alcohol (B).

In the present embodiment, a molar ratio of hydroxyl groups in the alcohol (B) to the isocyanato groups in the isocyanate (A) is preferably within a range of 0.8 to 1.2, more preferably within a range of 0.85 to 1.15, and even more preferably within a range of 0.9 to 1.1. When the molar ratio is within the above range, it is possible to obtain a resin which is suitable for being used as an optical material, particularly, a spectacle lens.

When thiol is added as an additive to the polymerizable composition obtained in the present embodiment, light resistance of the composition markedly deteriorates. When a primary amine and a secondary amine are added as amines to the composition, a reaction between the amines and isocyanate proceeds rapidly, and consequentially, the viscosity of the polymerizable composition increases too much at the time of casting. As a result, workability deteriorates, or striae occur in the obtained molded product. The problems caused by the addition of a metal catalyst are as described above. In many cases, an organic tin compound is used as a metal catalyst for a thiopolyurethane resin. The polymerizable composition of the present embodiment does not contain the organic tin compound, which has become an issue due to its harmfulness to the human body resulting from high toxicity and endocrine disruptor, and makes it possible to manufacture a resin used for spectacles. Accordingly, the safety of the manufacturing process thereof or the safety of the obtained molded product is much higher.

According to the process for producing a polyurethane resin of the present embodiment, even when aromatic isocyanate is used, a prepolymer or a polymerizable composition excellent in handleability at room temperature (equal to or less than 30° C.) can be used. Accordingly, a polyurethane resin can be obtained with an excellent yield, and the production stability of the polyurethane resin is excellent.

Moreover, when the process for producing a polyurethane resin of the present invention is applied to a producing method of a polyurethane-molded product, it is possible to stably obtain a polyurethane-molded product in which the occurrence of an injection flow mark or striae is inhibited. Such a polyurethane-molded product can be suitably used for various optical materials that require a high degree of transparency. The process for producing a polyurethane resin of the present invention is suitable for the industrial production of polyurethane-molded products.

<Use>

By varying the mold used at the time of cast polymerization, the molded product comprised of the polyurethane resin of the present embodiment can be obtained in various forms. Having a high degree of transparency, the polyurethane-molded product of the present embodiment can be used for various purposes such as a plastic lens, a camera lens, a Light Emitting Diode (LED), a prism, optical fiber, an information recording substrate, a filter, and an optical resin for a light emitting diode or the like. Particularly, the molded product is suitable as an optical material such as a plastic lens, a camera lens, or a light emitting diode and as an optical element.

Examples of the plastic lens include a plastic spectacle lens comprised of a polythiourethane resin and a plastic polarizing lens in which a layer comprised of a polyurethane resin is laminated over at least one surface of a polarizing film.

<Process for Producing Polyurethane Resin>

The process for producing a polyurethane resin of the present embodiment is performed by the following steps (i) to (iii) by using the aforementioned components. Hereinafter, each of the steps will be described.

[Step (i)]

In the step (i), the alcohol (B) is added to the isocyanate (A) such that the ratio of hydroxyl groups to isocyanato groups of the isocyanate (A) falls into a range of 10 mol % to 20 mol %, and the isocyanate (A) and the alcohol (B) are reacted to undergo prepolymerization. The reaction is performed in the presence of the acidic phosphoric acid ester (C) and the hindered amine-based compound (D).

When the reaction is performed by adding the acidic phosphoric acid ester (C) alone as a catalyst, the isocyanate (A) reacts with the acidic phosphoric acid ester (C), and as a result, white solids having low solubility are precipitated in some cases. When polymerization is performed in this state, the transparency of the obtained resin is impaired, and thus the resin becomes inappropriate for being used for spectacles in some cases.

However, when the prepolymerization is performed in the presence of the acidic phosphoric acid ester (C) and the hindered amine-based compound (D), the reaction between the isocyanate (A) and the acidic phosphoric acid ester (C) is inhibited, and the precipitation of white solids having low solubility is inhibited. Consequentially, in the step (i), it is preferable for the isocyanate (A) and the alcohol (B), in which a ratio of hydroxyl groups to isocyanato groups of the isocyanate (A) is within a range of 10 mol % to 20 mol %, to be reacted in the presence of the acidic phosphoric acid ester (C) and the hindered amine-based compound (D).

Although the reaction temperature is not particularly limited, it is preferable to perform the reaction at room temperature (equal to or less than 30° C.)

The prepolymer obtained in the step (i) can be obtained in the form of a prepolymer having viscosity of equal to or less than 1,000 mPa·s at 20° C. When the viscosity is within the above range, it is preferable since the prepolymer is easily handled and does not cause any problem in working at room temperature.

[Step (ii)]

In the step (ii), at a temperature of equal to or less than 30° C., the alcohol (B) is further added to and mixed with the prepolymer obtained in the step (i), thereby obtaining a polymerizable composition. The amount of the alcohol (B) added in the step (ii) is equal to the remainder obtained by subtracting the amount of the alcohol used for the prepolymerization from the total amount of the alcohol (B) used for manufacturing a polyurethane resin.

The mixing step in the step (ii) is performed at room temperature (equal to or less than 30° C.). Accordingly, it is possible to inhibit the occurrence of an injection flow mark or striae in the obtained molded product and to inhibit rapid increase in viscosity of the polymerizable composition. As a result, the viscosity of the obtained polymerizable composition becomes equal to or less than 1,000 mPa·s at 20° C., and thus the polymerizable composition is easily injected into a mold in the following molding step. In addition, when a two-liquid mixing and dispensing unit (dispenser) is used, it is possible to inhibit adherence loss and contamination of the instrument used, and to prevent pipe from being blocked or prevent the instrument such as a pump from breaking down.

The mixing apparatus used in the step (ii) is not particularly limited, and the aforementioned dynamic mixer-type dispenser can be used. The mixer of the dispenser includes a line mixer type which does not have a mixer driving portion for performing stirring and a dynamic mixer type which has a driving portion. From the viewpoint of stirring efficiency of the polymerizable composition of the present embodiment, the dynamic mixer-type dispenser is more preferable.

The dynamic mixer-type dispenser (mixing apparatus) of the present embodiment is described by using a drawing as follows.

As shown in FIG. 1, a mixing apparatus 10 of the present embodiment includes a cylindrical container 12; a shaft 14 that has been inserted into the container 12 from the upper portion of the container 12 along the central axis direction of the container; a stirring blade 16 that is wound in the form of a screw around the outer circumferential surface of the shaft 14; a first supply portion 18 that is disposed in the upper portion of the container 12 and supplies the prepolymer into the container 12; a second supply portion 20 that is disposed in the upper portion of the container 12 and supplies the alcohol (B) into the container 12; and an ejection portion 22 that is disposed at the bottom of the container 12.

The container 12 may include a cooler, and can cool the prepolymer and the alcohol (B) supplied into the container 12 to a temperature equal to or less than 30° C. when mixing them together.

The top of the shaft 14 is connected to a mixer driving portion and can be rotated at a predetermined rotation frequency.

The first supply portion 18 includes a supply unit, such as a pump, or a tank not shown in the drawing, and can supply the prepolymer into the container 12 at a predetermined rate. The second supply portion 20 includes a supply unit, such as a pump, or a tank not shown in the drawing, and can supply the alcohol (B) into the container 12 at a predetermined rate.

In the present embodiment, examples of the dynamic mixer-type dispenser (mixing apparatus 10) include a two fluid blending and ejecting apparatus (trade name: Super Shot series (manufactured by Nippon Sosey Kogyo corporation)), MAK series (trade name, manufactured by M & K Co., Ltd.), and the like.

When the mixing apparatus 10 shown in FIG. 1 is used, the step (ii) includes the following steps.

Step a: the prepolymer and the alcohol (B) are supplied into the container 12 from the first supply portion 18 and the second supply portion 20 respectively.

Step b: A polymerizable composition is obtained by rotating the shaft 14 such that the prepolymer and the alcohol (B) are moved down while being mixed together at a temperature of equal to or less than 30° C. by the stirring blade 16 which is wound in the form of screw around the outer circumferential surface of the shaft 14, and the obtained polymerizable composition is ejected from the ejection portion 22.

(Step a)

The prepolymer and the alcohol (B) may be supplied into the container 12 in any order without any particular limitation. However, it is preferable that these are simultaneously supplied. Moreover, the place from which the solutions are supplied is not particularly limited, and it is preferable that these are supplied in a position perpendicular to the surface of the blade. Furthermore, when the solution has high viscosity, it is preferable to supply the solution along the shaft since stirring efficiency can be further improved.

(Step b)

The rotation frequency (rotation frequency of the shaft 14) of the mixer of the dispenser is within a range of 1,000 rpm to 4,000 rpm, more preferably within a range of 1,500 rpm to 3,500 rpm, and even more preferably within a range of 2,000 rpm to 3,000 rpm. When the rotation frequency is within the above range, the prepolymer and the alcohol (B) can be uniformly mixed, and accordingly, it is possible to inhibit the obtained molded product from obtaining irregular streaks that are formed when mixing is not thoroughly performed.

The rate at which the polymerizable composition is ejected from the ejection portion 22 is within a range of 0.5 g/s to 4.0 g/s, preferably within a range of 0.5 g/s to 3.0 g/s, and more preferably within a range of 1.0 g/s to 3.0 g/s. When the rate is within the above range, it is possible to inhibit the occurrence of an injection flow mark or striae by controlling irregular streaks that are formed when mixing is not thoroughly performed and polymerization properties.

The use of the dynamic mixer-type dispenser makes it possible to further reduce the viscosity of the obtained polymerizable composition. Therefore, the use of such a dispenser is more preferable since mass production can be realized, and the occurrence of an injection flow mark or striae in the molded product can be effectively inhibited. In the present embodiment, the viscosity of the polymerizable composition obtained in the step b can be equal to or less than 500 mPa·s at 20° C.

[Step (iii)]

In the step (iii), by polymerizing the prepolymer and the alcohol (B) contained in the polymerizable composition, a polyurethane resin is produced. In the present embodiment, a method for obtaining a molded product comprised of the polyurethane resin will be described for example.

The polymerizable composition obtained in the present embodiment is injected into a mold (casting mold) held by a gasket, a tape, or the like. The polymerizable composition obtained by the process for producing the present embodiment has a viscosity of equal to or less than 1,000 mPa·s, and can be easily handled at room temperature (equal to or less than 30° C.). Therefore, casting can be performed at a temperature of equal to or less than 30° C. At this time, depending on the physical properties required for the obtained molded product, it is preferable to perform degassing processing under reduced pressure or filtration processing such as pressurization or pressure reduction.

For polymerizing the prepolymer and the alcohol (B) contained in the polymerizable composition, a heating start temperature is set to be equal to or less than 30° C., and the polymerizable composition is polymerized by being heated at a temperature that is slowly increased from the aforementioned temperature. When the heating start temperature is higher than 30° C., release properties of the molded product obtained after the polymerization markedly deteriorates, and striae easily occurs in the molded product to be obtained. For this reason, the heating start temperature of the polymerizable composition is preferably equal to or less than 30° C. The polymerization conditions are not limited because the conditions greatly vary with the type of the isocyanate or the alcohol used, the shape of the mold, and the like. However, the polymerization is performed at a temperature of about 0° C. to 140° C. for 1 hour to 48 hours.

If necessary, the molded product comprised of the polyurethane resin of the present embodiment may be subjected to processing such as annealing. The processing temperature is generally within a range of 50° C. to 150° C. However, the processing temperature is preferably 90° C. to 140° C., and more preferably 100° C. to 130° C.

If necessary, a plastic lens comprised of the polyurethane-molded product of the present embodiment may be used after a coating layer is provided over one or both surfaces of the lens. Examples of the coating layer include a primer layer, a hard coat layer, an antireflection layer, an antifogging coating layer, an antifouling layer, a water repellent layer, and the like. Each of these coating layers may be used singly, or a plurality of the coating layers may be used in the form of a multi-layer. When the coating layer is provided on both surfaces of the plastic lens, the same coating layer or different coating layers may be provided on the respective surfaces.

For each of the coating layers, an ultraviolet absorber for protecting the lens or the eye from ultraviolet rays, an infrared absorber for protecting the eye from infrared rays, a light stabilizer or an antioxidant for improving weather resistance of the lens, a dye or a pigment for making the lens more fashionable, a photochromic dye, a photochromic pigment, an antistatic agent, and other known additives for improving the performance of the lens may be concurrently used. For the layer to be subjected to coating, various leveling agents for improving coating properties may be used.

The primer layer is generally formed between the hard coat layer, which will be described later, and the optical lens. The primer layer is a coating layer for improving the adhesiveness between the hard coat layer to be formed on the primer layer and the lens. In some cases, the primer layer can also improve the impact resistance. For the primer layer, any material can be used as long as it exhibits a high degree of adhesiveness with respect to the obtained lens. However, generally, a primer composition or the like that contains a urethane-based resin, an epoxy-based resin, a polyester-based resin, a melanin-based resin, or polyvinylacetal as a main component is used. In order to adjust the viscosity of the primer composition, an appropriate solvent that does not exert an influence on the lens may be used for the primer composition. Needless to say, a solvent may not be used for the primer composition.

The primer layer can be formed by any of a coating method and a dry method using the primer composition. When the coating method is used, the lens is coated with the primer composition by a known coating method such as spin coating or dip coating, and then the resultant is solidified, whereby the primer layer is formed. When the dry method is used, the primer layer is formed by a known dry method such as a CVD method or a vacuum deposition method. Informing the primer layer, if necessary, in order to improve the adhesiveness, the lens surface may be subjected to preprocessing such as alkali processing, plasma processing, or ultraviolet processing.

The hard coat layer is a coating layer for imparting functions such as scratch resistance, abrasion resistance, moisture resistance, hot water resistance, heat resistance, and weather resistance to the lens surface.

The hard coat layer is generally obtained from a hard coat composition which contains one or more kinds of particles composed of an organic silicon compound having curability, and one or more kinds of oxide particles of an element selected from the group of elements including Si, Al, Sn, Sb, Ta, Ce, La, Fe, Zn, W, Zr, In, and Ti and/or a composite oxide of two or more kinds of elements selected from the group of elements.

The hard coat composition preferably contains at least any of amines, amino acids, metal acetylacetonate complexes, organic acid metal salts, perchloric acids, salts of perchloric acids, acids, metal chlorides, and polyfunctional epoxy compounds, in addition to the aforementioned components. For the hard coat composition, an appropriate solvent that does not exert an influence on the lens may be used. Needless to say, a solvent may not be used for the composition.

Generally, the lens is coated with the hard coat composition by a known coating method such as spin coating or dip coating, and then the composition is cured, whereby the hard coat layer is formed. Examples of curing methods include thermal curing, curing methods performed by irradiation of energy rays such as ultraviolet rays or visible rays, and the like. In order to inhibit formation of interference fringes, a difference between the refractive index of the hard coat layer and the refractive index of the lens is preferably within a range of ±0.1.

Generally, the antireflection layer is formed on the hard coat layer if necessary. The antireflection layer is classified into an inorganic antireflection layer and an organic antireflection layer. The inorganic antireflection layer is comprised of an inorganic oxide such as $SiO_2$ or $TiO_2$ by a dry method such as a vacuum deposition method, a sputtering method, an ion plating method, an ion beam-assisted method, and a CVD method. The organic antireflection layer is comprised of a composition, which contains an organic silicon compound and silica-based particles having internal cavities, by a wet method.

The antireflection layer is composed of a single layer or multiple layers. When it is used in the form of a single layer, a value obtained by subtracting the refractive index of the antireflection layer from the refractive index of the hard coat layer is preferably at least equal to or greater than 0.1. In order to cause the antireflection layer to effectively perform an antireflection function, it is preferable to constitute the antireflection film with multiple films, and in this case, a film with a low refractive index and a film with a high refractive index are alternately laminated on each other. Even in this case, a difference in refractive index between the film with a low refractive index and the film with a high refractive index is preferably equal to or greater than 0.1. Examples of the film with a high refractive index include films of ZnO, $TiO_2$, $CeO_2$, $Sb_2O_5$, $SnO_2$, $ZrO_2$, $Ta_2O_5$, and the like, and examples of the film with a low refractive index include films of $SiO_2$ and the like.

If necessary, an antifogging coating layer, an antifouling layer, or a water repellent layer may be formed on the antireflection layer. Regarding the method for forming the antifogging layer, the antifouling layer, and the water repellent layer, the method, material, and the like used for treating these layers are not particularly limited as long as they do not exert a negative influence on the antireflection function. It is possible to use known methods and materials used for an antifogging coating treatment, an antifouling treatment, and a water repellency treatment. Examples of the methods used for the antifogging treatment and the antifouling treatment include a method of covering the surface with a surfactant; a method of giving water absorbing properties to the layer by adding a hydrophilic film to the surface of the layer; a method of improving the water absorbing properties by forming fine concavities and convexities on the surface of the layer; a method of giving water absorbing properties to the layer by utilizing photocatalytic activity; a method of performing a super water repellency treatment on the layer to prevent water drops from adhering to the layer; and the like. Examples of the methods used for the water repellency treatment include a method of forming a layer having undergone the water repellency treatment by vapor deposition or sputtering a fluorine-containing silane compound or the like; a method of dissolving a fluorine-containing silane compound in a solvent and then coating a layer with the solution so as to form a layer having undergone the water repellency treatment; and the like.

The plastic lens using the polyurethane resin of the present embodiment may be used after being dyed with a dye according to the purpose, so that the lens becomes fashionable or obtains photochromic properties. The lens can be dyed by a known dyeing method, but generally, the following method is used.

Generally, the lens is dyed by a method in which an original lens, which has undergone finishing to have a predetermined optical surface, is dipped in a dyeing liquid in which a dye to be used is dissolved or uniformly dispersed (dyeing step), and then the lens is heated if necessary to fix the dye (annealing step after dyeing). The dye used in the dyeing step is not particularly limited as long as it is a known dye, but generally, an oil-soluble dye or a disperse dye is used. The solvent used in the dyeing step is not particularly limited as long as the dye to be used can be dissolved or uniformly dispersed in the solvent. In the dyeing step, if necessary, a surfactant for dispersing the dye in the dyeing liquid or a carrier for accelerating dyeing may be added. During the dyeing step, a dye, and a surfactant which is added if necessary, are dispersed in water or a mixture consisting of water and an organic solvent so as to prepare a dye bath, the optical lens is dipped in the dye bath, and the lens is dyed for a predetermined time at a predetermined temperature. The dyeing temperature and time can be varied according to the intended color concentration. Generally, the lens may be dyed for a few minutes to tens of hours at a temperature equal to or lower than 120° C., and the dye concentration of the dye bath is set to be 0.01% by weight to 10% by weight. Moreover, when the lens is not easily dyed, dyeing may be performed under reduced pressure. The annealing step after dyeing that is performed if necessary is a step of performing heating processing on the dyed original lens. In the heating processing, water remaining on the surface of the original lens, which has been dyed in the dyeing step, is removed by using a solvent or the like, or alternatively, the solvent is air-dried, and then the lens is caused to stay for a predetermined time in a furnace such as an infrared heating furnace in the atmosphere or a resistance heating furnace. In the annealing step after dyeing, color loss of the dyed original lens is prevented (color loss-preventing processing), and water penetrated inside of the original lens at the time of dyeing is removed.

[Manufacturing Method of Plastic Polarizing Lens]

When a plastic polarizing lens is manufactured by the process for producing a polyurethane resin of the present embodiment, the following step (a) is performed before the step (iii). Furthermore, the step (iii) includes the following steps (b) and (c).

Step (a): A polarizing film is fixed into a casting mold for molding a lens, in a state in which at least one surface of the polarizing film is separated from the mold.

Step (b): The polymerizable composition of the present embodiment is injected into space(s) between the polarizing film and the mold.

Step (c): The polymerizable composition is polymerized and cured, and a layer comprised of a polyurethane resin is laminated over at least one surface of the polarizing film.

Hereinafter, each of the steps will be described in order.

Step (a)

A polarizing film comprised of thermoplastic polyester or the like is installed in the internal space of the casting mold for molding a lens such that at least one of the film surfaces becomes parallel to the inner surface of the mold facing the film surface. Space(s) is formed between the polarizing film and the mold. The polarizing film may be shaped beforehand.

Step (b)

Thereafter, by a predetermined injection unit, the polymerizable composition of the present embodiment is injected into the space(s) between the mold and the polarizing film within the internal space of the casting mold for molding a lens.

Step (c)

Then the casting mold for molding a lens, into which the polymerizable composition has been injected and the polarizing film has been fixed, is heated for several hours to tens of hours according to a predetermined temperature program in a heating device such as an oven or in water, thereby performing curing and molding.

The temperature of the polymerization and curing are not limited since the conditions vary with the makeup of the polymerizable composition, the type of the catalyst, the mold shape, and the like. However, the polymerization and curing is performed for 1 hour to 48 hours at a temperature of 0° C. to 140° C.

After the curing and molding ends, the molded product is taken out of the casting mold for molding a lens. In this way, it is possible to obtain the plastic polarizing lens of the present embodiment in which the layer comprised of a polyurethane resin is laminated over at least one surface of the polarizing film.

After being released from the mold, the released plastic polarizing lens of the present embodiment is desirably subjected to annealing processing performed by heating, such that strain resulting from polymerization is relieved.

If necessary, the plastic polarizing lens of the present embodiment is used after a coating layer is provided over one or both surfaces thereof. Examples of the coating layer include a primer layer, a hard coat layer, an antireflection layer, an antifogging coat layer, an antifouling layer, a water repellent layer, and the like, similarly to the plastic spectacle lens.

In some cases, the plastic lenses for spectacles are stored for a relatively long period of time in a packed state. While being stored in this state, the lenses are scratched or deformed by absorbing moisture. Moreover, the lenses are discolored, and due to the difference in the storage period between the lenses, the color of the lens for the left eye becomes different from the color of the lens for the right eye. That is, the quality of the lenses becomes problematic in some cases.

In this case, such problems can be suppressed or improved by known packing technologies (for example, Japanese Unexamined Patent Publication No. 2007-99313, Japanese Unexamined Patent Publication No. 2007-24998, and Japanese Unexamined Patent Publication No. 9-216674).

Specifically, it is possible to use a method in which the lens is stored in a package which is comprised of a material having properties (gas barrier properties) inhibiting transmission of oxygen or oxygen and moisture vapor and which is filled with inert gas, in an air-tight state; a method in which the lens is stored together with a deoxidizer in a package, which is comprised of a material having properties (gas barrier properties) inhibiting transmission of oxygen or oxygen and moisture vapor, in an air-tight state; a method in which the lens is vacuum sealed; and the like.

As the deoxidizer, known substances can be used. Examples of the deoxidizer include a substance obtained by packing a deoxidizer composition absorbing oxygen with an air-permeable packing material. As the deoxidizer composition, for example, a composition that absorbs oxygen by utilizing an oxidation reaction of a reducing metal can be used. The deoxidizer using such a deoxidizer composition includes a moisture-dependent deoxidizer which needs to be supplied with moisture from the atmosphere so as to remove oxygen and a self-reactive deoxidizer that does not need to be supplied with moisture from the atmosphere. When the self-reactive deoxidizer is used, it may be enclosed in a packing material together with a desiccant (for example, silica gel). Moreover, a deoxidizer having both the deoxidizing function and drying function may be used (for example, Pharmakeep (KD or KC type) manufactured by MITSUIBISHI GAS CHEMICAL COMPANY, INC.). In addition, a deoxidizer that performs the deoxidizing function in a dry atmosphere without requiring a moisture donator may be used. Examples of the deoxidizer include a deoxidizer having a deoxidizing component comprised of a cross-linked polymer having an unsaturated carbon-carbon bond (for example, see Japanese Unexamined Patent Publication No. 11-70331); a deoxidizer mainly composed of a metal that is obtained by causing a transition metal to be supported on a support and activating the transition metal (for example, see Japanese Unexamined Patent Publication No. 8-38883); a deoxidizer mainly composed of activated magnesium that is obtained by causing a magnesium compound to be supported on a support and then reducing the compound (for example, see Japanese Unexamined Patent Publication No. 2001-37457); a deoxidizer that is mainly composed of a liquid hydrocarbon oligomer having an unsaturated group and contains an oxygen-absorbing composition obtained by causing an oxygen absorption-accelerating substance to be supported on a support (for example, see Japanese Unexamined Patent Publication No. 10-113555); and the like. Examples of commercially available products thereof include Pharmakeep (KH type) manufactured by MITSUIBISHI GAS CHEMICAL COMPANY, INC.

Examples of the self-reactive deoxidizer include a deoxidizer obtained by adding a moisture donator to the deoxidizer described in Japanese Examined Patent Publication No. 57-31449 such that moisture necessary for removing oxygen is supplied from the donator.

The package can be filled with inert gas or sealed in a manner in which air in the package is substituted with inert gas by removing the air in the package and then filing the package with inert gas, and the opening of the package is sealed in this state.

As the inert gas that fills the package, nitrogen, argon, helium, neon, and the like can be used. From the viewpoint of economic efficiency, it is preferable to use nitrogen gas.

In order to prevent deterioration such as deformation of lens caused by moisture or to remove the moisture in the air remaining in the package, a desiccant (for example, silica gel) may be enclosed in the package together with the lens.

The package is preferably comprised of a material that is comprised of at least a material inhibiting transmission of oxygen and contains a metal foil layer such as aluminum having a low oxygen transmission rate.

Up to now, embodiments of the present invention have been described. However, the embodiments are merely examples of the present invention, and various constituents other than the above can be employed.

The mixing apparatus shown in FIG. 1 is not particularly limited in terms of the shape, the position of the constituents in the apparatus, and the like, as long as the mixing apparatus includes the respective constituents.

EXAMPLES

Hereinafter, the present invention will be more specifically described based on examples.

The ratio of secondary hydroxyl groups contained in the alcohol to the total molar number of the primary and secondary hydroxyl groups contained in the alcohol was calculated by using proton nuclear magnetic resonance spectroscopy, $^1$H-NMR (400 MHz). The measurement conditions are as follows.

Apparatus: ECP-400P (manufactured by JEOL Ltd.)
Number of times of integration: 16
Range of observation: 8,000 Hz
Measurement temperature: room temperature (21° C. to 22° C.)
Sequence: single pulse
Pulse width: 5.75 μs (45° pulse)
Repetition time: 7.2 s An alcohol in an amount of 30 mg to 35 mg was diluted with deuterated chloroform, and then 0.1 ml of trifluoroacetic anhydride was added thereto and reacted with the alcohol at 20° C. to 25° C. for 1 hour. Thereafter, the state in which the reaction was completed was confirmed. By using the reaction liquid, $^1$H-NMR was measured, and the ratio of the secondary hydroxyl groups was calculated by the following equation.

$$X=A/(A+B/2)\times 100$$

X: The ratio of the secondary hydroxyl groups
A: An integral value of chemical shift of 5.3 ppm to 5.6 ppm (chemical shift of protons of a methine group)
B: An integral value of chemical shift of 4.2 ppm to 4.5 ppm (chemical shift of protons of a methylene group)

The workability of the prepolymer obtained in the step (i) and the workability of the polymerizable composition obtained in the step (ii) were judged by viscosity (mPa·s) measured by a B type viscometer at 20° C. When the viscosity of the prepolymer or the polymerizable composition was equal to or less than 1,000 mPa·s at 20° C., the workability thereof was evaluated to be "no problem", and when it was greater than 1,000 mPa·s, the workability thereof was evaluated to be "problematic".

In performance tests of the resin, the external appearance (irregularity caused by mixing, injection flow mark, and striae), a refractive index, an Abbe number, specific gravity, and heat resistance were evaluated in the following manner.

Irregularity caused by mixing: It refers to irregular streaks formed when the polymerizable composition is not uniformed mixed. The obtained lens was observed under a high-pressure mercury lamp. At this time, when the irregularity caused by mixing was not observed in the lens, the lens was evaluated to be "absent", and when it was observed, the lens was evaluated to be "present".

Injection flow mark: It refers to a mark observed at the time of casting due to the excessively high viscosity of the polymerizable composition. The light of a high-pressure mercury lamp was projected to the obtained lens. At this time, when the injection flow mark was not observed in the lens, the lens was evaluated to be "absent", and when it was observed, the lens was evaluated to be "present".

Striae: It refers to strain in the form of streaks occurring when curing does not uniformly proceed due to rapid polymerization. The light of a high-pressure mercury lamp was projected to the obtained lens. At this time, when the striae were not observed in the lens, the lens was evaluated to be "absent", and when it was observed, the lens was evaluated to be "present".

Refractive index (ne) and Abbe number (ve): These were measured at 20° C. by using a Pulfrich refractometer.

Specific gravity: It was measured by an Archimedes' method.

Heat resistance: A glass transition temperature Tg was measured by a TMA penetration method (load: 50 g, pin tip: 0.5 mmΦ, rate of temperature increase: 10° C./min).

Example 1

3.0 g of ultraviolet absorber (Biosorb 583 manufactured by KYODO CHEMICAL CO., LTD.), 1.04 g of Zelec UN (acidic phosphoric acid ester manufactured by Stepan Company), and 0.80 g of TINUVIN 292 (hindered amine-based compound manufactured by BASF Corporation) were mixed to and dissolved in 94.2 g of a mixture of 2,4-tolylene diisocyanate and 2,6-tolylene diisocyanate, thereby preparing a uniform solution. After the solution was held at 20° C., 15.8 g (the ratio of the secondary hydroxyl groups measured by the aforementioned method: 70%) of a propylene oxide adduct of trimethylolpropane (Desmophen 4011T manufactured by Bayer MaterialScience) was added thereto, and the resultant was reacted at 20° C. for 3 hours (step (i)). It was confirmed that the obtained prepolymer had viscosity of 100 mPa·s at 20° C. and did not cause any problem in working. Thereafter, after the prepolymer was held at 20° C., 89.8 g of a propylene oxide adduct of trimethylolpropane (Desmophen 4011T manufactured by Bayer MaterialScience) was uniformly mixed with the prepolymer at 20° C. by using a stirrer bar (step (ii)). It was confirmed that the obtained polymerizable composition had viscosity of 400 mPa·s at 20° C. and did not cause any problem in working. The polymerizable composition was injected into 10 molds. The molds were put into an oven for polymerization and heated at a temperature that was slowly increased up to 130° C. from 30° C. over 24 hours, thereby polymerizing the composition (step (iii)). After the polymerization ended, the molds were taken out of the oven, and the molded products were released from the mold. The products were excellently released, and peeling of the mold was not observed. The obtained molded products were subjected to an annealing processing at 120° C. for 2 hours. The obtained molded products were transparent, had a refractive index (ne) of 1.55, an Abbe number (ve) of 34, specific gravity of 1.20, and Tg of 110° C., and were suitable for being used as an optical material. Furthermore, in the obtained 10 lenses, none of the irregularity caused by mixing, the injection flow mark, and the striae were observed. The results are shown in Table 1.

Examples 2 to 5 and Comparative Examples 1 to 5

Molded products were obtained in the same manner as in Example 1, except that the ratio (mol %) of the hydroxyl groups of the alcohol (B) to the isocyanato groups of the isocyanate (A) in the step (i) and the reaction temperature of the steps (i) and the step (ii) were changed as the conditions described in Table 1. Regarding the external appearance of the obtained lenses, when a problem is observed in at least one lens among the prepared 10 lenses, the lens was evaluated to be "present", and when a problem is not observed in any of the lenses, the lens was evaluated to be "absent". The results are shown in Table 1.

Comparative Example 6

Molded products comprised of "Polymer 1" of Example 12 of Patent Document 1 (PCT Japanese Translation Patent Publication No. 2009-520057) were obtained according to the description of the document. Regarding the external appearance of the obtained lenses, when a problem is observed in at least one lens among the prepared 10 lenses, the lens was evaluated to be "present", and when a problem is not observed in any of the lenses, the lens was evaluated to be "absent". The results are shown in Table 1.

Comparative Example 7

Molded products were manufactured in the same manner as in Example 1, except that TINUVIN 292 (hindered amine-based compound manufactured by BASF Corporation) was not added in the step (i). Because white solids having low solubility were precipitated during the reaction of the step (i), the reaction was stopped. The results are shown in Table 1.

TABLE 1

| | Isocyanate (A) | Alcohol (B) | *1 | Hindered amine-based compound (D) | Step (i) Prepolymerization *2 | Step (ii) Mixing of prepolymer with alcohol Temperature (° C.) | Mixing method | Viscosity of prepolymer/ 20° C. | Viscosity of polymerizable composition/ 20° C. |
|---|---|---|---|---|---|---|---|---|---|
| Example 1 | i-1 | A-1 | 70 | Added | 15 | 20 | 20 | Stirring and mixing performed using stirrer bar | <1000 mPa·S | <1000 mPa·S |
| Example 2 | i-1 | A-1 | 70 | Added | 10 | 20 | 20 | | <1000 mPa·S | <1000 mPa·S |
| Example 3 | i-1 | A-1 | 70 | Added | 20 | 20 | 20 | | <1000 mPa·S | <1000 mPa·S |
| Example 4 | i-1 | A-1 | 70 | Added | 15 | 30 | 20 | | <1000 mPa·S | <1000 mPa·S |
| Example 5 | i-1 | A-1 | 70 | Added | 15 | 30 | 30 | | <1000 mPa·S | <1000 mPa·S |
| Comparative example 1 | i-1 | A-1 | 70 | Added | 5 | 20 | 20 | Stirring and mixing performed using stirrer bar | <1000 mPa·S | <1000 mPa·S |
| Comparative example 2 | i-1 | A-1 | 70 | Added | 25 | 20 | 20 | | <1000 mPa·S | >1000 mPa·S |
| Comparative example 3 | i-1 | A-1 | 70 | Added | 15 | 20 | 40 | | <1000 mPa·S | <1000 mPa·S |
| Comparative example 4 | i-1 | A-1 | 70 | Added | 15 | 20 | 60 | | <1000 mPa·S | >1000 mPa·S |
| Comparative example 5 | i-1 | A-1 | 70 | Added | 25 | 20 | 60 | | <1000 mPa·S | >1000 mPa·S |
| Comparative example 6 | Based on Example 12 of PCT Japanese Translation Patent Publication No. 2009-520057 | | | | | | | >1000 mPa·S | >1000 mPa·S |

TABLE 1-continued

| | | | | | | | | | | |
|---|---|---|---|---|---|---|---|---|---|---|
| Comparative example 7 | i-1 | A-1 | 70 | Not added | 15 | 20 | 20 | Stirring and mixing performed using stirrer bar | Reaction was stopped due to precipitation of insoluble component | — |

| | External appearance of lens | | | Optical properties | | | Heat resistance |
|---|---|---|---|---|---|---|---|
| | Irregularity caused by mixing | Injection flow mark | striae | Refractive index [ne] | Abbe number [ve] | Specific gravity | Tg (° C.) |
| Example 1 | Absent | Absent | Absent | 1.55 | 34 | 1.20 | 110 |
| Example 2 | Absent | Absent | Absent | 1.55 | 34 | 1.20 | 110 |
| Example 3 | Absent | Absent | Absent | 1.55 | 34 | 1.20 | 110 |
| Example 4 | Absent | Absent | Absent | 1.55 | 34 | 1.20 | 110 |
| Example 5 | Absent | Absent | Absent | 1.55 | 34 | 1.20 | 110 |
| Comparative example 1 | Present | Absent | Present | 1.55 | 34 | 1.20 | 110 |
| Comparative example 2 | Present | Present | Absent | 1.55 | 34 | 1.20 | 110 |
| Comparative example 3 | Absent | Absent | Present | 1.55 | 34 | 1.20 | 110 |
| Comparative example 4 | Absent | Absent | Present | 1.55 | 34 | 1.20 | 110 |
| Comparative example 5 | Absent | Absent | Present | 1.55 | 34 | 1.20 | 110 |
| Comparative example 6 | Absent | Absent | Present | — | — | — | — |
| Comparative example 7 | — | — | — | — | — | — | — |

*1: A ratio of secondary hydroxyl groups to a total molar number of primary and secondary hydroxyl groups (mol %)
*2: A ratio of hydroxyl groups to isocyanato groups (mol %)
i-1: A mixture of 2,4-tolylene diisocyanate and 2,6-tolylene diisocyanate
A-1: A propylene oxide adduct of trimethylolpropane (Desmophen 4011T manufactured by Bayer MaterialScience)

Example 6

A polymerizable composition was blended in the same manner as in Example 1, except that mixing in the step (ii) was performed at 30° C. by using a Super Shot series (trade name) as a two fluid blending and ejecting apparatus manufactured by Nippon Sosey Kogyo corporation. The rotation frequency of the mixer was 2,500 rpm, and the ejection rate as 1.0 g/s. It was confirmed that the obtained polymerizable composition had viscosity of 300 mPa·s at 20° C. and did not cause any problem in working. The polymerizable composition was injected into 50 molds. The molds were put into an oven for polymerization and heated at a temperature that was slowly increased up to 130° C. from 30° C. over 24 hours, thereby performing polymerization. After the polymerization ended, the molds were taken out of the oven, and molded products were released from the mold. The products were released excellently, and peeling of the mold was not observed. The obtained molded products were subjected to an annealing processing at 120° C. for 2 hours. The obtained molded products were transparent, had a refractive index (ne) of 1.55, an Abbe number (ve) of 34, specific gravity of 1.20, and Tg of 110° C., and were suitable for being used as an optical material. Furthermore, in the obtained 50 lenses, none of the irregularity caused by mixing, the injection flow mark, and the striae were observed. The results are shown in Table 2.

Examples 7 to 13

Molded products were obtained in the same manner as in Example 6, except that the type of mixer of the two fluid blending and ejecting apparatus, the rotation frequency, and the ejection rate in the step (ii) were changed to the conditions described in Table 2. Regarding the external appearance of the obtained lenses, when a problem is observed in at least one lens among the prepared 50 lenses, the lens was evaluated to be "present", and when a problem is not observed in any of the lenses, the lens was evaluated to be "absent". The results are shown in Table 2.

TABLE 2

| | | Alcohol (B) | | Hindered amine-based compound (D) | Step (i) Prepolymerization Temperature (° C.) | Step (ii) Mixing of prepolymer with alcohol | | | | |
|---|---|---|---|---|---|---|---|---|---|---|
| | Isocyanate (A) | | *1 | *2 | | Temperature (° C.) | Mixing method | Rotation frequency (rpm) | Ejection rate (g/s) | Viscosity of prepolymer/20° C. |
| Example 6 | i-1 | A-1 | 70 | Added | 15 | 30 | 30 | Dispenser | 2500 | 1.0 | <1000 mPa·S |
| Example 7 | i-1 | A-1 | 70 | Added | 15 | 30 | 30 | (dynamic | 2500 | 0.5 | <1000 mPa·S |
| Example 8 | i-1 | A-1 | 70 | Added | 15 | 30 | 30 | type) | 2500 | 3.0 | <1000 mPa·S |

TABLE 2-continued

| | | | | | | | | | | |
|---|---|---|---|---|---|---|---|---|---|---|
| Example 9 | i-1 | A-1 | 70 | Added | 15 | 30 | 30 | 2500 | 4.0 | <1000 mPa · S |
| Example 10 | i-1 | A-1 | 70 | Added | 15 | 30 | 30 | 1000 | 1.0 | <1000 mPa · S |
| Example 11 | i-1 | A-1 | 70 | Added | 15 | 30 | 30 | 3000 | 1.0 | <1000 mPa · S |
| Example 12 | i-1 | A-1 | 70 | Added | 15 | 30 | 30 | 1000 | 3.0 | <1000 mPa · S |
| Example 13 | i-1 | A-1 | 70 | Added | 15 | 30 | 30 | 3000 | 0.5 | <1000 mPa · S |

| | | External appearance of lens | | | Optical properties | | | Heat |
|---|---|---|---|---|---|---|---|---|
| | Viscosity of polymerizable composition/20° C. | Irregularity caused by mixing | Injection flow mark | striae | Refractive index [ne] | Abbe number [ve] | Specific gravity | resistance Tg (° C.) |
| Example 6 | <500 mPa · S | Absent | Absent | Absent | 1.55 | 34 | 1.20 | 110 |
| Example 7 | <500 mPa · S | Absent | Absent | Absent | 1.55 | 34 | 1.20 | 110 |
| Example 8 | <500 mPa · S | Absent | Absent | Absent | 1.55 | 34 | 1.20 | 110 |
| Example 9 | <500 mPa · S | Absent | Absent | Absent | 1.55 | 34 | 1.20 | 110 |
| Example 10 | <500 mPa · S | Absent | Absent | Absent | 1.55 | 34 | 1.20 | 110 |
| Example 11 | <500 mPa · S | Absent | Absent | Absent | 1.55 | 34 | 1.20 | 110 |
| Example 12 | <500 mPa · S | Absent | Absent | Absent | 1.55 | 34 | 1.20 | 110 |
| Example 13 | <500 mPa · S | Absent | Absent | Absent | 1.55 | 34 | 1.20 | 110 |

*1: A ratio of secondary hydroxyl groups to a total molar number of primary and secondary hydroxyl groups (mol %)
*2: A ratio of hydroxyl groups to isocyanato groups (mol %)
i-1: A mixture of 2,4-tolylene diisocyanate and 2,6-tolylene diisocyanate
A-1: A propylene oxide adduct of trimethylolpropane (Desmophen 4011T manufactured by Bayer MaterialScience)

Examples 14 to 21 and Comparative Examples 8 to 11

Molded products were manufactured in the same manner as in Example 6, except that the composition of the isocyanate (A) and the alcohol (B) was changed as shown in Table 3. Regarding the external appearance of the obtained lenses, when a problem is observed in at least one lens among the prepared 50 lenses, the lens was evaluated to be "present", and when a problem is not observed in any of the lenses, the lens was evaluated to be "absent". The results are shown in Table 3.

TABLE 3

| | | | Hindered amine-based compound (D) | Step (i) Prepolymerization | | Step (ii) Mixing of prepolymer with alcohol | | | | |
|---|---|---|---|---|---|---|---|---|---|---|
| | Isocyanate (A) | Alcohol (B) | | | Temperature (° C.) | Temperature (° C.) | Mixing method | Rotation frequency (rpm) | Ejection rate (g/s) | Viscosity of prepolymer/20° C. |
| | | | *1 | *2 | | | | | | |
| Example 14 | i-2 (47.1%) | A-1 (52.9%) | 70 | Added | 15 | 30 | 30 | Dispenser (dynamic type) | 2500 | 1.0 | <1000 mPa · S |
| Example 15 | i-1 (51.4%) | A-1 (32.5%), A-2 (3.5%), A-3 (2.5%), A-4 (10.1%) | 54 | Added | 15 | 30 | 30 | | 2500 | 1.0 | <1000 mPa · S |
| Example 16 | i-1 (59.0%) | A-1/A-5/A-6 (28.7%/8.2%/4.1%) | 52 | Added | 15 | 30 | 30 | | 2500 | 1.0 | <1000 mPa · S |
| Example 17 | i-1 (45.6%) | A-1/A-7 (49.0%/5.4%) | 66 | Added | 15 | 30 | 30 | | 2500 | 1.0 | <1000 mPa · S |
| Example 18 | i-1 (50.80%) | A-8 (49.2%) | 88 | Added | 15 | 30 | 30 | | 2500 | 1.0 | <1000 mPa · S |
| Example 19 | i-1 (48.9%) | A-8/A-9 (46.0%/5.1%) | 85 | Added | 15 | 30 | 30 | | 2500 | 1.0 | <1000 mPa · S |
| Example 20 | i-1 (57.6%) | A-10/A-11 (21.2%/21.2%) | 52 | Added | 15 | 30 | 30 | | 2500 | 1.0 | <1000 mPa · S |
| Example 21 | i-1 (46.2%) | A-12 (53.8%) | 82 | Added | 15 | 30 | 30 | | 2500 | 1.0 | <1000 mPa · S |
| Comparative example 8 | i-1 (59.9%) | A-2/A-13 (15.6%/24.5%) | 0 | Added | 15 | 30 | 30 | Dispenser (dynamic type) | 2500 | 1.0 | <1000 mPa · S |
| Comparative example 9 | i-1 (67.0%) | A-14 (33.0%) | 0 | Added | 15 | 30 | 30 | | 2500 | 1.0 | <1000 mPa · S |

TABLE 3-continued

| | | | | | | | | | | | |
|---|---|---|---|---|---|---|---|---|---|---|---|
| Comparative example 10 | i-1 (74.9%) | A-5 (25.1%) | 32 | Added | 15 | 30 | 30 | | 2500 | 1.0 | <1000 mPa · S |
| Comparative example 11 | i-1 (57.6%) | A-10/A-11 (29.7%/12.7%) | 35 | Added | 15 | 30 | 30 | | 2500 | 1.0 | <1000 mPa · S |

| | Viscosity of polymerizable composition/ 20° C. | External appearance of lens | | | Optical properties | | Specific gravity | Heat resistance Tg (° C.) |
|---|---|---|---|---|---|---|---|---|
| | | Irregularity caused by mixing | Injection flow mark | striae | Refractive index [ne] | Abbe number [ve] | | |
| Example 14 | <500 mPa · S | Absent | Absent | Absent | 1.55 | 34 | 1.20 | 110 |
| Example 15 | <500 mPa · S | Absent | Absent | Absent | 1.55 | 33 | 1.21 | 109 |
| Example 16 | <500 mPa · S | Absent | Absent | Absent | 1.57 | 31 | 1.26 | 135 |
| Example 17 | <500 mPa · S | Absent | Absent | Absent | 1.55 | 34 | 1.20 | 106 |
| Example 18 | <500 mPa · S | Absent | Absent | Absent | 1.55 | 33 | 1.23 | 118 |
| Example 19 | <500 mPa · S | Absent | Absent | Absent | 1.55 | 33 | 1.23 | 109 |
| Example 20 | <500 mPa · S | Absent | Absent | Absent | 1.57 | 31 | 1.26 | 110 |
| Example 21 | <500 mPa · S | Absent | Absent | Absent | 1.55 | 34 | 1.21 | 112 |
| Comparative example 8 | *3 | — | — | — | — | — | — | — |
| Comparative example 9 | *3 | — | — | — | — | — | — | — |
| Comparative example 10 | *3 | — | — | — | — | — | — | — |
| Comparative example 11 | *3 | — | — | — | — | — | — | — |

*1: A ratio of secondary hydroxyl groups to a total molar number of primary and secondary hydroxyl groups (mol %)
*2: A ratio of hydroxyl groups to isocyanato groups (mol %)
*3: Due to a rapid reaction occurring in the process of blending, a great quantity of heat was produced, and viscosity increased, and as a result, the composition could not be injected into a mold.
i-1: A mixture of 2,4-tolylene diisocyanate and 2,6-tolylene diisocyanate
i-2: 2,4-Tolylene diisocyanate
A-1: A propylene oxide adduct of trimethylolpropane (Desmophen 4011T manufactured by Bayer MaterialScience)
A-2: Trimethylolpropane (manufactured by Tokyo Chemical Industry Co., Ltd., product number T0480)
A-3: Di(trimethylolpropane) (manufactured by Sigma-Aldrich Co, LLC., product number 416134)
A-4: Tripropylene glycol (manufactured by Tokyo Chemical Industry Co., Ltd., product number T0523)
A-5: Glycerol (manufactured by Wako Pure Chemical Industries, Ltd., product number 075-00616)
A-6: Diglycerol (manufactured by Tokyo Chemical Industry Co., Ltd., product number T0119)
A-7: An ethylene oxide adduct of trimethylolpropane (manufactured by Sigma-Aldrich Co, LLC., product number 409782, average molecular weight: about 730)
A-8: A propylene oxide adduct of glycerol (manufactured by Sigma-Aldrich Co, LLC., product number 410284, average molecular weight: about 266)
A-9: An ethylene oxide adduct of glycerol (manufactured by Sigma-Aldrich Co, LLC., product number 441864, average molecular weight: about 1,000)
A-10: An ethylene oxide adduct of pentaerythritol (manufactured by Sigma-Aldrich Co, LLC., product number 416150, average molecular weight: about 270)
A-11: Dipropylene glycol (manufactured by Tokyo Chemical Industry Co., Ltd., product number D0933)
A-12: A propylene oxide adduct of pentaerythritol (manufactured by Sigma-Aldrich Co, LLC., product number 418749, average molecular weight: about 428)
A-13: 1,4-Cyclohexanedimethanol (manufactured by Tokyo Chemical Industry Co., Ltd., product number C0479)
A-14: 1,4-Butanediol (manufactured by Tokyo Chemical Industry Co., Ltd., product number B0680)

As shown in Comparative examples 1 to 6, when the ratio of hydroxyl groups to isocyanato groups of the isocyanate (A) is out of a range of 10 mol % to 20 mol %, the increase in viscosity of the polymerizable composition and the occurrence of the irregularity caused by mixing, the injection flow mark, and the striae were observed. Moreover, as shown in Comparative example 7, when the polymerizable composition did not contain the hindered amine-based compound, insoluble components were precipitated, and accordingly, the reaction was stopped.

In Examples 6 to 21 and Comparative examples 8 to 11, the polymerizable composition was blended by using the two fluid blending and ejecting apparatus.

As shown in Comparative examples 8 to 11, when the alcohol (B), in which the ratio of the secondary hydroxyl groups to the total molar number of the primary and secondary hydroxyl groups is equal to or less than 50 mol %, is blended with the isocyanate (A), a rapid reaction occurred during blending. As a result, a great quantity of heat was produced, the viscosity increased, and casting failed. In contrast, as is evident from Examples 6 to 21, when the ratio of the secondary hydroxyl groups contained in the alcohol (B) to the total molar number of the primary and secondary hydroxyl groups contained in the alcohol (B) was equal to or greater than 50 mol %, and the rotation frequency and the ejection rate at the time of blending were within the range of the present invention, casting could be easily performed by using the mold, and it was possible to obtain a polyurethane-molded product in which the occurrence of the injection flow mark or striae are inhibited and which enables mass production.

The molded product obtained by the process for producing a polyurethane resin of the present invention can be suitably used in various optical materials requiring a high degree of transparency, particularly, in spectacle lenses.

The present application claims priorities based on Japanese Patent Application No. 2012-255568 filed on Nov. 21, 2012, Japanese Patent Application No. 2013-063478 filed on Mar. 26, 2013, and Japanese Patent Application No. 2013-121627 filed on Jun. 10, 2013, and the entire contents of which are incorporated herein.

The present invention can also include the following embodiments.

[a1] A polymerizable composition including: (A) isocyanate containing aromatic isocyanate; (B) an alcohol; and (C) an acidic phosphoric acid ester represented by the following Formula (1), in which in the alcohol (B), a ratio of secondary hydroxyl groups to a total molar number of hydroxyl groups is equal to or greater than 50%,

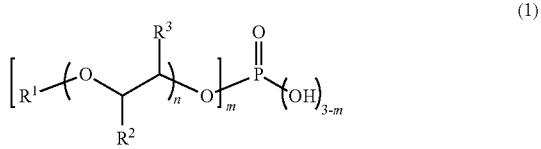

(1)

wherein, in the formula, m represents an integer of 1 or 2; n represents an integer of 0 to 18, $R^1$ represents an alkyl group having 1 to 20 carbon atoms; and each of $R^2$ and $R^3$ independently represents a hydrogen atom, a methyl group, or an ethyl group.

[a2] The polymerizable composition described in [a1], in which the alcohol (B) contains one or more kinds of compound selected from among glycerol, diglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol.

[a3] The polymerizable composition described in [a1] or [a2], in which the alcohol (B) contains one or more kinds of compound selected from among a propylene oxide adduct of glycerol, a propylene oxide adduct of trimethylolpropane, and a propylene oxide adduct of pentaerythritol.

[a4] The polymerizable composition described in any one of [a1] to [a3], in which the aromatic isocyanate is 2,4-tolylene diisocyanate or a mixture of 2,4-tolylene diisocyanate and 2,6-tolylene diisocyanate.

[a5] The polymerizable composition described in any one of [a1] to [a4], in which the acidic phosphoric acid ester (C) is contained in an amount of 0.1 parts by weight to 3.0 parts by weight with respect to a total of 100 parts by weight of the isocyanate (A) and the alcohol (B).

[a6] The polymerizable composition described in any one of [a1] to [a5], further including a hindered amine-based compound, in which the hindered amine-based compound is contained in an amount of 0.1 parts by weight to 2.0 parts by weight with respect to a total of 100 parts by weight of the isocyanate (A) and the alcohol (B).

[a7] A manufacturing method of a molded product, including a step of obtaining the polymerizable composition described in [a1] by mixing the alcohol (B) with the acidic phosphoric acid ester (C) and then mixing the mixture with the isocyanate (A) containing the aromatic isocyanate at a temperature of equal to or less than 30° C., a step of injecting the polymerizable composition into a casting mold, and a step of starting the polymerization of the polymerizable composition from a temperature of equal to or less than 30° C. and polymerizing the composition.

[a8] A molded product obtained by the manufacturing method described in [a7].

[a9] An optical material comprised of the molded product described in [a8].

[a10] A plastic lens comprised of the optical material described in [a9].

The present invention can also include the following embodiments.

[b1] A polymerizable composition for an optical material, including: (A) one or more kinds of isocyanate having two or more isocyanato groups, which contains aromatic isocyanate; (B) one or more kinds of alcohol having two or more hydroxyl groups; and (C) an acidic phosphoric acid ester represented by the following Formula (1), in which in the alcohol (B), a ratio of secondary hydroxyl groups to a total molar number of primary and secondary hydroxyl groups is equal to or greater than 50%,

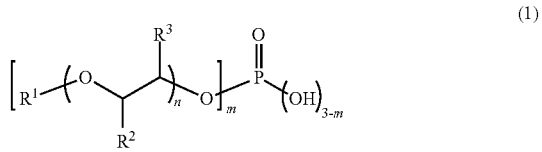

(1)

wherein, in the formula, m represents an integer of 1 or 2; n represents an integer of 0 to 18; R1 represents an alkyl group having 1 to 20 carbon atoms; and each of $R^2$ and $R^3$ independently represents a hydrogen atom, a methyl group, or an ethyl group.

[b2] The polymerizable composition for an optical material described in [b1], in which the alcohol (B) contains one or more kinds of compound selected from among glycerol, diglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol.

[b3] The polymerizable composition for an optical material described in [b1] or [b2], in which the alcohol (B) contains one or more kinds of compound selected from among a propylene oxide adduct of glycerol, a propylene oxide adduct of trimethylolpropane, and a propylene oxide adduct of pentaerythritol.

[b4] The polymerizable composition for an optical material described in any one of [b1] to [b3], in which the aromatic isocyanate is 2,4-tolylene diisocyanate or a mixture of 2,4-tolylene diisocyanate and 2,6-tolylene diisocyanate.

[b5] The polymerizable composition for an optical material described in any one of [b1] to [b4], in which the acidic phosphoric acid ester (C) is contained in an amount of 0.1 parts by weight to 3.0 parts by weight with respect to a total of 100 parts by weight of the isocyanate (A) and the alcohol (B).

[b6] The polymerizable composition for an optical material described in any one of [b1] to [b5], further including a hindered amine-based compound, in which the hindered amine-based compound is contained in an amount of 0.1 parts by weight to 2.0 parts by weight with respect to a total of 100 parts by weight of the isocyanate (A) and the alcohol (B).

[b7] A molded product obtained from the polymerizable composition for an optical material described in any one of [b1] to [b6].

[b8] An optical material comprised of the molded product described in [b7].

[b9] A plastic lens comprised of the optical material described in [b8].

The present invention also includes the following embodiments.

[c1] A process for producing a polyurethane resin, including a step (i) of obtaining a prepolymer by adding an alcohol (B) to isocyanate (A) such that a ratio of hydroxyl groups to isocyanato groups of the isocyanate (A) falls into a range of 10 mol % to 20 mol % and by reacting the isocyanate (A) with the alcohol (B) in the presence of an acidic phosphoric acid ester (C) and a hindered amine-based compound (D); a step (ii) of obtaining a polymerizable composition in a manner in which the alcohol (B) is further added to and mixed with the prepolymer at a temperature of equal to or less than 30° C.; and a step (iii) of polymerizing the prepolymer and the alcohol (B) contained in the polymerizable composition, in which the isocyanate (A) is one or more kinds of isocyanate having two or more isocyanato groups, which contains aromatic isocyanate, the alcohol (B) includes one or more kinds of alcohol having two or more hydroxyl groups, and in the alcohol (B), a ratio of secondary hydroxyl groups to a total molar number of primary and secondary hydroxyl groups is equal to or greater than 50 mol %.

[c2] The process described in [c1], in which a reaction temperature of the step (i) is equal to or less than 30° C.

[c3] The process described in [c1] or [c2], in which in the step (iii), a heating start temperature at the time of polymerizing the prepolymer and the alcohol (B) is equal to or less than 30° C.

[c4] The process described in any one of [c1] to [c3], in which the viscosity of the prepolymer and the polymerizable composition is equal to or less than 1,000 mPa·s at 20° C.

[c5] The process described in any one of [c1] to [c4], in which the step (ii) is performed by using a mixing apparatus comprising:
a cylindrical container,
a shaft that is inserted into the container from the upper portion of the container along the central axis direction of the container,
a stirring blade that is wound in the form of a screw around the outer circumferential surface of the shaft,
a first supply portion that is disposed in the upper portion of the container and supplies the prepolymer into the container,
a second supply portion that is disposed in the upper portion of the container and supplies the alcohol (B) into the container, and
an ejection portion that is disposed at the bottom of the container, and
wherein the step (ii) includes
a step of supplying the prepolymer and the alcohol (B) into the container from the first supply portion and the second supply portion respectively and
a step of preparing the polymerizable composition by rotating the shaft such that the prepolymer and the alcohol (B) are moved down while being mixed together at a temperature of equal to or less than 30° C. by the stirring blade, which is wound in the form of a screw around the outer circumferential surface of the shaft, and ejecting the obtained polymerizable composition from the ejection portion.

[c6] The process described in [c5], in which a rotation frequency of the shaft is within a range of 1,000 ppm to 4,000 ppm, and a rate at which the polymerizable composition is ejected from the ejection portion is within a range of 0.5 g/s to 4.0 g/s.

[c7] The process described in [c5] or [c6], in which the viscosity of the polymerizable composition obtained in the step (ii) is equal to or less than 500 mPa·s at 20° C.

[c8] The process described in any one of [c1] to [c7], in which the aromatic isocyanate contained in the isocyanate (A) is 2,4-tolylene diisocyanate or a mixture of 2,4-tolylene diisocyanate and 2,6-tolylene diisocyanate.

[c9] The process described in any one of [c1] to [c8], in which the alcohol (B) contains one or more kinds of compound selected from among glycerol, diglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol.

[c10] The process described in any one of [c1] to [c9], in which the alcohol (B) contains one or more kinds of compound selected from among a propylene oxide adduct of glycerol, a propylene oxide adduct of trimethylolpropane, and a propylene oxide adduct of pentaerythritol.

[c11] The process described in any one of [c1] to [c10], in which the acidic phosphoric acid ester (C) is contained in the polymerizable composition, in an amount of 0.1 parts by weight to 3.0 parts by weight with respect to a total of 100 parts by weight of the isocyanate (A) and the alcohol (B).

[c12] The process described in any one of [c1] to [c11], in which the acidic phosphoric acid ester (C) is an acidic phosphoric acid ester represented by Formula (2),

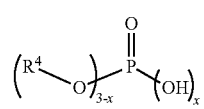

$$\left(R^4 \diagdown O \right)_{3-x} \overset{\overset{\displaystyle O}{\|}}{P} \left( OH \right)_x \qquad (2)$$

wherein, in the formula, x represents an integer of 1 or 2, and $R^4$ represents an alkyl group having 8 to 16 carbon atoms.

[c13] The process described in any one of [c1] to [c12], in which the hindered amine-based compound (D) is contained in the polymerizable composition, in an amount of 0.1 parts by weight to 2.0 parts by weight with respect to a total of 100 parts by weight of the isocyanate (A) and the alcohol (B).

[c14] A polyurethane resin obtained by the process described in any one of [c1] to [c13].

[c15] A manufacturing method of a polyurethane-molded product, in which in the process for producing a polyurethane resin described in any one of [c1] to [c13], the step (iii) includes a step of injecting the polymerizable composition into a mold, and a step of polymerizing the prepolymer and the alcohol (B) contained in the polymerizable composition in the mold.

[c16] A polyurethane-molded product obtained by the manufacturing method described in [c15].

[c17] An optical material comprised of the polyurethane-molded product described in [c16].

[c18] A plastic lens comprised of the optical material described in [c17].

The invention claimed is:
1. A process for producing a polyurethane resin, comprising:
a step (i) of obtaining a prepolymer by adding an alcohol (B) to isocyanate (A) such that a ratio of hydroxyl groups to isocyanato groups of the isocyanate (A) falls into a range of 10 mol % to 20 mol % and reacting the isocyanate (A) with the alcohol (B) in the presence of an acidic phosphoric acid ester (C) and a hindered amine-based compound (D);

a step (ii) of obtaining a polymerizable composition in a manner in which the alcohol (B) is further added to and mixed with the prepolymer at a temperature of equal to or less than 30° C.; and a step (iii) of polymerizing the prepolymer and the alcohol (B) contained in the polymerizable composition, wherein the isocyanate (A) is one or more kinds of isocyanate (A) having two or more isocyanato groups, which contains aromatic isocyanate, the alcohol (B) includes one or more kinds of alcohol having two or more hydroxyl groups, and in the alcohol (B), a ratio of secondary hydroxyl groups to a total molar number of primary and secondary hydroxyl groups is equal to or greater than 50 mol %.

2. The process according to claim 1,
wherein a reaction temperature of the step (i) is equal to or less than 30° C.

3. The process according to claim 1,
wherein in the step (iii), a heating start temperature at the time of polymerizing the prepolymer and the alcohol (B) is equal to or less than 30° C.

4. The process according to claim 1,
wherein the viscosity of the prepolymer and the polymerizable composition is equal to or less than 1,000 mPa·s at 20° C.

5. The process according to claim 1,
wherein the step (ii) is performed by using a mixing apparatus comprising:
a cylindrical container,
a shaft that is inserted into the container from the upper portion of the container along the central axis direction of the container,
a stirring blade that is wound in the form of a screw around the outer circumferential surface of the shaft,
a first supply portion that is disposed in the upper portion of the container and supplies the prepolymer into the container,
a second supply portion that is disposed in the upper portion of the container and supplies the alcohol (B) into the container, and
an ejection portion that is disposed at the bottom of the container,
wherein the step (ii) includes a step of supplying the prepolymer and the alcohol (B) into the container from the first supply portion and the second supply portion respectively and
a step of preparing the polymerizable composition by rotating the shaft such that the prepolymer and the alcohol (B) are moved down while being mixed together at a temperature of equal to or less than 30° C. by the stirring blade, which is wound in the form of a screw around the outer circumferential surface of the shaft, and ejecting the obtained polymerizable composition from the ejection portion.

6. The process according to claim 5,
wherein a rotation frequency of the shaft is within a range of 1,000 rpm to 4,000 rpm, and a rate at which the polymerizable composition is ejected from the ejection portion is within a range of 0.5 g/s to 4.0 g/s.

7. The process according to claim 5,
wherein the viscosity of the polymerizable composition obtained in the step (ii) is equal to or less than 500 mPa·s at 20° C.

8. The process according to claim 1,
wherein the aromatic isocyanate contained in the isocyanate (A) is 2,4-tolylene diisocyanate or a mixture of 2,4-tolylene diisocyanate and 2,6-tolylene diisocyanate.

9. The process according to claim 1,
wherein the alcohol (B) contains one or more kinds of compound selected from among glycerol, diglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol.

10. The process according to claim 1,
wherein the alcohol (B) contains one or more kinds of compound selected from among a propylene oxide adduct of glycerol, a propylene oxide adduct of trimethylolpropane, and a propylene oxide adduct of pentaerythritol.

11. The process according to claim 1,
wherein the acidic phosphoric acid ester (C) is contained in the polymerizable composition, in an amount of 0.1 parts by weight to 3.0 parts by weight with respect to a total of 100 parts by weight of the isocyanate (A) and the alcohol (B).

12. The process according to claim 1,
wherein the acidic phosphoric acid ester (C) is an acidic phosphoric acid ester represented by Formula (1),

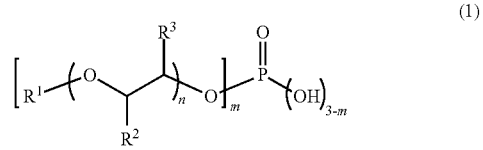

wherein, in the formula, m represents an integer of 1 or 2; n represents an integer of 0 to 18; $R^1$ represents an alkyl group having 1 to 20 carbon atoms; and each of $R^2$ and $R^3$ independently represents a hydrogen atom, a methyl group, or an ethyl group.

13. The process according to claim 1,
wherein the hindered amine-based compound (D) is contained in the polymerizable composition, in an amount of 0.1 parts by weight to 2.0 parts by weight with respect to a total of 100 parts by weight of the isocyanate (A) and the alcohol (B).

14. A polyurethane resin obtained by the process according to claim 1.

15. A manufacturing method of a polyurethane-molded product,
wherein in the process for producing a polyurethane resin according to claim 1, the step (iii) includes a step of injecting the polymerizable composition into a mold, and a step of polymerizing the prepolymer and the alcohol (B) contained in the polymerizable composition in the mold.

16. A polyurethane-molded product obtained by the manufacturing method according to claim 15.

17. An optical material comprised of the polyurethane-molded product according to claim 16.

18. A plastic lens comprised of the optical material according to claim 17.

19. A manufacturing method of a plastic polarizing lens, wherein in the process for producing a polyurethane resin according to claim 1, a step of fixing a polarizing film into a casting mold for lens casting in a state in which at least one surface of the polarizing film is separated from the mold is performed before the step (iii), and the step (iii) includes a step of injecting the polymerizable composition obtained in the step (ii) into space(s) between the polarizing film and the mold, and a step of polymerizing and curing the polymerizable composition and laminating a layer comprised of the polyurethane resin over at least one surface of the polarizing film.

20. A plastic polarizing lens obtained by the manufacturing method according to claim 19.

* * * * *